(12) United States Patent
Terada et al.

(10) Patent No.: US 10,089,490 B2
(45) Date of Patent: Oct. 2, 2018

(54) BUSINESS CARD MANAGEMENT SERVER, BUSINESS CARD IMAGE ACQUIRING APPARATUS, BUSINESS CARD MANAGEMENT METHOD, BUSINESS CARD IMAGE ACQUIRING METHOD, AND STORAGE MEDIUM

(71) Applicant: Sansan, Inc., Tokyo (JP)

(72) Inventors: Chikahiro Terada, Tokyo (JP); Kenji Shiomi, Tokyo (JP)

(73) Assignee: Sansan, Inc., Tokyo (JP)

( * ) Notice: Subject to any disclaimer, the term of this patent is extended or adjusted under 35 U.S.C. 154(b) by 277 days.

(21) Appl. No.: 14/765,326

(22) PCT Filed: Jan. 15, 2014

(86) PCT No.: PCT/JP2014/050536
§ 371 (c)(1),
(2) Date: Jul. 31, 2015

(87) PCT Pub. No.: WO2014/122954
PCT Pub. Date: Aug. 14, 2014

(65) Prior Publication Data
US 2015/0379300 A1    Dec. 31, 2015

(30) Foreign Application Priority Data

Feb. 8, 2013  (JP) ................................. 2013-023580

(51) Int. Cl.
*G06F 21/62*  (2013.01)
*G06F 17/30*  (2006.01)
(Continued)

(52) U.S. Cl.
CPC .... *G06F 21/6245* (2013.01); *G06F 17/30253* (2013.01); *G06K 9/00469* (2013.01); *G06Q 10/10* (2013.01)

(58) Field of Classification Search
CPC .......... G06F 21/6245; G06F 17/30253; G06Q 10/10; G06K 9/00469
(Continued)

(56) References Cited

U.S. PATENT DOCUMENTS 7,813,822 B1 * 10/2010 Hoffberg ............ G06K 9/00369
381/73.1
7,848,545 B2 * 12/2010 Kameyama ........ G06K 9/00248
382/118
(Continued)

FOREIGN PATENT DOCUMENTS

JP     11-066082 A     3/1999
JP     11-282612 A    10/1999
(Continued)

OTHER PUBLICATIONS

Extended European Search Report dated Aug. 25, 2016 issued in European Patent Application No. 14748899.3.
(Continued)

*Primary Examiner* — Abu Sholeman
(74) *Attorney, Agent, or Firm* — McDermott Will & Emery LLP

(57) ABSTRACT

Provided is a business card management server that makes it possible to efficiently input information on business cards while protecting personal security, including: a business card information storage unit 101 in which business card information having a business card image and a business card identifier is stored; a piece storage unit 102 in which two or more pieces, each of which is an image in which only part of a business card image is recognizable, are stored for each business card image; a piece transmitting unit 104 that transmits two or more piece information each of which has one of two or more pieces corresponding to one business card image and further has a business card identifier, to one or more input terminals 20; a partial business card informa-
(Continued)

tion receiving unit 105 that receives partial business card information having a business card identifier and a business card partial character string corresponding to a piece, from the input terminals 20; and a business card partial character string accumulating unit 110 that accumulates the business card partial character string, in the business card information storage unit 101, in association with the received business card identifier.

13 Claims, 36 Drawing Sheets

(51) Int. Cl.
  *G06K 9/00* (2006.01)
  *G06Q 10/10* (2012.01)
(58) Field of Classification Search
  USPC .......................................................... 726/28
  See application file for complete search history.

(56) References Cited

U.S. PATENT DOCUMENTS

| | | | |
|---|---|---|---|
| 7,925,620 B1* | 4/2011 | Yoon | G06Q 10/109 707/609 |
| 7,970,655 B2* | 6/2011 | Schwab | G06Q 30/0601 348/161 |
| 8,600,830 B2* | 12/2013 | Hoffberg | G06Q 30/0207 705/14.71 |
| 9,621,404 B2* | 4/2017 | Davis | H04L 29/0872 |
| 9,703,985 B1* | 7/2017 | Sanchez | G06F 21/6245 |
| 2006/0065733 A1* | 3/2006 | Lee | G06F 17/30879 235/462.01 |
| 2006/0071429 A1* | 4/2006 | Okujyo | A63F 3/00157 273/292 |
| 2008/0244378 A1 | 10/2008 | Chen et al. | |
| 2011/0075220 A1 | 3/2011 | Chiba | |
| 2011/0276602 A1* | 11/2011 | Terada | G06Q 10/10 707/784 |
| 2012/0079081 A1* | 3/2012 | Parks | G06F 3/1204 709/220 |
| 2013/0159413 A1* | 6/2013 | Davis | H04L 29/0872 709/204 |
| 2013/0346302 A1* | 12/2013 | Purves | G06Q 20/102 705/40 |
| 2014/0126825 A1* | 5/2014 | Luo | G06Q 10/10 382/190 |
| 2014/0297535 A1* | 10/2014 | Pinsker | G06Q 20/042 705/45 |

FOREIGN PATENT DOCUMENTS

| | | |
|---|---|---|
| JP | 2004-139595 A | 5/2004 |
| JP | 2005-025323 A | 1/2005 |
| JP | 2007-183985 A | 7/2007 |
| JP | 2008-020939 A | 1/2008 |
| JP | 2008-259156 A | 10/2008 |
| JP | 2009-200989 A | 9/2009 |
| JP | 4651630 B2 | 3/2011 |
| JP | 2011-077705 A | 4/2011 |
| WO | 2011/058757 A1 | 5/2011 |

OTHER PUBLICATIONS

Japanese Office Action dated Mar. 26, 2015 issued in Japansese Patent Application No. 2013-023580 (English translation).
International Search Report dated Feb. 4, 2014 issued in International Patent Application No. PCT/JP2014/050536 (English translation thereof).

* cited by examiner

Business card image management information

| Business card ID | User ID | Image | Date |
|---|---|---|---|
| 0010001 | U001 | U001NAME01.png | 2012/12/05 |
| 0010002 | U001 | U001NAME03.png | 2012/12/16 |
| 0010003 | U001 | U001NAME07.png | 2012/12/16 |
| 0010004 | U001 | U001NAME08.png | 2012/12/26 |
| 0010005 | U001 | U001NAME10.png | 2013/01/11 |
| 0020001 | U002 | U002NAME01.png | 2012/02/05 |
| 0020002 | U002 | U002NAME02.png | 2012/02/16 |
| 0020003 | U002 | U002NAME03.png | 2012/02/19 |
| ⋮ | ⋮ | ⋮ | ⋮ |

FIG.8

| Business card ID | Piece |
|---|---|
| 0010006 | 00100061.png |
| 0010006 | 00100062.png |
| 0010006 | 00100063.png |
| 0010006 | 00100064.png |
| 0010006 | 00100065.png |
| 0010006 | 00100066.png |
| 0010006 | 00100067.png |
| 0010006 | 00100068.png |
| ⋮ | ⋮ |

FIG.11

| Input terminal identifier |
|---|
| OP0001 |
| OP0002 |
| OP0003 |
| OP0004 |
| OP0005 |
| OP0006 |
| OP0007 |
| OP0008 |
| OP0009 |
| OP0010 |
| OP0011 |
| OP0012 |
| OP0013 |
| ⋮ |

FIG.12

| Input terminal identifier | Business card identifier |
|---|---|
| OP0001 | 0010001 |
| OP0001 | 0010002 |
| OP0001 | 0010003 |
| OP0001 | 0010004 |
| OP0001 | 0010005 |
| OP0002 | 0010001 |
| OP0002 | 0010002 |
| OP0002 | 0010003 |
| OP0002 | 0010004 |
| OP0002 | 0010005 |
| OP0002 | 0020001 |
| OP0002 | 0020002 |
| OP0003 | 0020001 |
| ⋮ | ⋮ |

FIG.13

| Business card ID | Item | Character string |
|---|---|---|
| 0010006 | Family name | Suzuki |
| 0010006 | Given name | Taro |
| 0010006 | Address 1 | Tokyo, Shibuya-ku, |
| 0010006 | Telephone number | 03−654··· |
| 0010005 | Family name | Yamada |
| 0010005 | Given name | Ichiro |
| 0010005 | Address 1 | Tokyo, Minato-ku, |
| 0010005 | Address 2 | Roppongi,··· |
| ⋮ | ⋮ | ⋮ |

FIG.15

| Privilege identifier |
|---|
| OP1001 |
| OP1002 |
| OP1003 |
| OP1004 |
| OP1005 |
| OP1006 |
| ⋮ |

FIG.16

First business card image management information

| Business card image | User ID |
|---|---|
| U101NAME05.png | U101 |
| U021NAME25.png | U021 |
| U157NAME57.png | U157 |
| U009NAME18.png | U009 |
| U101NAME04.png | U101 |
| ⋮ | ⋮ |

FIG.22

BUSINESS CARD MANAGEMENT SERVER, BUSINESS CARD IMAGE ACQUIRING APPARATUS, BUSINESS CARD MANAGEMENT METHOD, BUSINESS CARD IMAGE ACQUIRING METHOD, AND STORAGE MEDIUM

RELATED APPLICATIONS

This application is the U.S. National Phase under 35 U.S.C. § 371 of International Application No. PCT/JP2014/050536, filed on Jan. 15, 2014 which in turn claims the benefit of Japanese Patent Application No. 2013-023580 filed on Feb. 8, 2013, the disclosures of which applications are incorporated by reference herein.

TECHNICAL FIELD

The present invention relates to a system and the like for managing business card information, for example.

BACKGROUND ART

Conventionally, there has been a business card information search apparatus including a business card information database with which multiple users can share information, wherein update information of a business card input from any user is shared by all users. This business card information search apparatus is an apparatus in which, if information indicating who was given a business card from whom is also registered, personal connection information can be obtained (see Patent Document 1).

CITATION LIST

Patent Document

[Patent Document 1] JP H11-66082A (p. 1, FIG. 1, etc.)

SUMMARY OF INVENTION

Technical Problem

However, conventionally, it was not possible to efficiently input information on business cards, while protecting personal security.

For example, in order to improve the efficiency of input of information on business cards, it is conceivable to ask operators or the like to input information on business cards. However, in the case of asking a third party such as operators or the like to input information on business cards, it is necessary to provide business cards or images of business cards to the operators or the like, and, thus, leakages of all information written on business cards may occur. As a result, it is difficult to maintain the security of personal information and the like written on business cards.

Solution to Problem

The present invention is directed to a business card management server forming a business card management system that includes: the business card management server that manages business card information; and one or more input terminals that input information on a business card; wherein the business card management server includes: a business card information storage unit in which one or more business card information each having a business card image and a business card identifier for identifying the business card image are stored; a piece storage unit in which two or more pieces, each of which is an image in which only part of a business card image is recognizable, are stored for each of one or more business card images; a piece transmitting unit that transmits two or more piece information each of which has one of two or more pieces corresponding to one business card image and further has a business card identifier for identifying the one business card image, to the one or more input terminals; a partial business card information receiving unit that receives partial business card information having a business card identifier and a business card partial character string, which is a character string corresponding to a piece, from the one or more input terminals; and a business card partial character string accumulating unit that accumulates the business card partial character string received by the partial business card information receiving unit, in the business card information storage unit, in association with the business card identifier received by the partial business card information receiving unit; and each of the input terminals includes: an accepting unit that accepts input of an operator who inputs a business card partial character string; a piece receiving unit that receives the piece information from the business card management server; a piece output unit that outputs a piece contained in the piece information received by the piece receiving unit; and a partial business card information transmitting unit that transmits partial business card information having the business card partial character string accepted by the accepting unit and the business card identifier received by the piece receiving unit, to the business card management server.

With this configuration, a mechanism is provided in which information on one business card is divided and input, and, thus, it is possible to efficiently input the information on the business card. Furthermore, it is possible to protect personal security regarding the input information on the business card, because the information on the business card is input while seeing a piece that is only partially recognizable.

According to the business card management server of the present invention, the business card management system includes two or more input terminals, and the piece transmitting unit of the business card management server transmits two or more piece information corresponding to one business card image respectively to the different input terminals.

With this configuration, a mechanism is provided in which information on one business card is divided and input by multiple people, and, thus, it is possible to efficiently input the information on the business card. Furthermore, it is possible to more strictly protect personal security, because not all of two or more pieces corresponding to one business card image are transmitted to one input terminal.

According to the business card management server of the present invention, the business card management server further includes apiece generating unit that acquires two or more pieces from a business card image stored in the business card information storage unit, and accumulates the two or more pieces in the piece storage unit.

With this configuration, it is possible to efficiently input information on a business card, while easily protecting personal security.

According to the business card management server of the present invention, the business card information has a business card image, a business card identifier, and two or more pairs of a business card partial character string and item information, which is information indicating an item of the business card partial character string, the partial business card information receiving unit receives partial business card information having a business card identifier, a business card partial character string, and item information, from the one or more input terminals, the business card partial character string accumulating unit accumulates the business card partial character string received by the partial business card information receiving unit, in the business card information storage unit, in association with the business card identifier and the item information received by the partial business card information receiving unit, the accepting unit of each of the input terminals accepts one or at least two pairs of a business card partial character string and item information, from the operator, and the partial business card information transmitting unit transmits partial business card information having a pair of the business card partial character string and the item information accepted by the accepting unit and the business card identifier received by the piece receiving unit, to the business card management server.

With this configuration, it is possible to efficiently input information on a business card for each item, while protecting personal security.

According to the business card management server of the present invention, the business card management server further includes: a determination condition storage unit in which a determination condition, which is a condition for determining the business card partial character strings and is a condition indicating that business card partial character strings transmitted from the input terminals of at least two or more operators match each other, is stored; and a determination judging unit that, in a case where the partial business card information receiving unit receives two or more business card partial character strings of the same item corresponding to one business card identifier, from two or more input terminals, judges whether or not the two or more business card partial character strings match the determination condition; wherein the business card partial character string accumulating unit determines the business card partial character strings, only in a case where the determination judging unit judges that the business card partial character strings match the determination condition.

With this configuration, it is possible to accumulate accurate information on a business card.

According to the business card management server of the present invention, the business card management server further includes: a privilege identifier storage unit in which a privilege identifier, which is information for communicating with an input terminal of a privileged operator who can view a business card image without masking, is stored; and a business card image transmitting unit that, in a case where a business card partial character string corresponding to at least part of items of one business card image is undetermined, transmits input prompting information and a business card identifier of the one business card image, the input prompting information being information for prompting a privileged input terminal, which is an input terminal identified with the privilege identifier, to input the undetermined business card partial character string; wherein the partial business card information receiving unit receives partial business card information having the business card identifier and the undetermined business card partial character string, from the privileged input terminal, and the privileged input terminal includes: a privileged accepting unit that accepts input of a privileged operator who inputs the undetermined business card partial character string; an input prompting information receiving unit that receives input prompting information and a business card identifier, from the business card management server; an input prompting information output unit that outputs the input prompting information received by the input prompting information receiving unit; and a privileged partial business card information transmitting unit that transmits partial business card information having the business card partial character string accepted by the accepting unit and the business card identifier received by the business card image receiving unit, to the business card management server.

With this configuration, it is possible to accumulate accurate information on a business card, using the ability of a reliable privileged operator.

According to the business card management server of the present invention, the input prompting information contains a business card image without masking.

With this configuration, it is possible to easily accumulate accurate information on a business card, using the ability of a reliable privileged operator.

According to the business card management server of the present invention, the business card management server further includes: a business card image receiving unit that receives a business card image; and a registration judging unit that judges whether or not the same business card image as the business card image is stored in the business card information storage unit; wherein the piece generating unit acquires two or more pieces from the business card image, and accumulates the two or more pieces in the piece storage unit, in a case where the registration judging unit judges that there is no same business card image.

With this configuration, it is possible to efficiently accumulate information on a business card, while preventing redundant information on a business card from being input.

According to the business card management server of the present invention, the business card management system includes two or more business card management servers, one of the business card management servers further includes: a language judging unit that judges a language in a business card image; and a foreign business card image transmitting unit that transmits a business card image, to a business card management server different from the one business card management server, according to the language judged by the language judging unit; and the piece receiving unit of part of the two or more input terminals receives piece information having a business card identifier and a piece, from the business card management server different from the one business card management server, and the partial business card information transmitting unit of the part of the input terminals transmits partial business card information having the business card partial character string accepted by the accepting unit and the business card identifier received by the piece receiving unit, to the business card management server different from the one business card management server.

With this configuration, it is possible to efficiently input information on business cards of a large number of countries, while protecting personal security.

According to the business card management server of the present invention, the piece is a masked image masked so as to be unrecognizable except for part of a business card image.

With this configuration, an item and the like of information on a recognizable portion can be inferred from a masked image and information on the business card can be input. Thus, it is possible to efficiently input accurate information on a business card.

According to the business card management server of the present invention, the piece is an extracted image obtained by extracting part of a business card image.

With this configuration, the portion of a business card image that the operator is allowed to view can be made minimum. Thus, it is possible to keep the security high.

According to the business card management server of the present invention, the piece includes both of a masked image masked so as to be unrecognizable except for part of a business card image, and the extracted image.

With this configuration, it is possible to output pieces according to the convenience of operators.

Furthermore, the present invention is directed to a business card image acquiring apparatus, including: a first business card image storage unit in which a business card image is stored; a masked image output unit that constructs and outputs a business card masked image, which is a masked image in which characters that appear in the business card image stored in the first business card image storage unit are masked; an input accepting unit that accepts input of a cutout instruction, which is an instruction containing an instruction to cut out a business card image portion, on the business card masked image; a business card image acquiring unit that acquires region information regarding a region that is to be extracted from the business card masked image according to the cutout instruction, and acquires a business card image of the region corresponding to the region information, from the business card image corresponding to the business card masked image; a second business card image storage unit in which the business card image acquired by the business card image acquiring unit is stored; and a business card image accumulating unit that accumulates the business card image acquired by the business card image acquiring unit, in the second business card image storage unit.

With this configuration, it is possible to efficiently input information on a business card, while protecting personal security. Specifically, it is possible to efficiently cut out a business card image, while protecting personal security.

Advantageous Effects of Invention

The business card management server and the like according to the present invention can efficiently input information on business cards, while protecting personal security.

BRIEF DESCRIPTION OF DRAWINGS

FIG. 8 is a table showing business card image management information of the business card management server in the embodiment.

FIG. 11 is a table showing piece management information of the business card management server in the embodiment.

FIG. 12 is a table showing input terminal management information of the business card management server in the embodiment.

FIG. 13 is a table showing terminal business card management information of the business card management server in the embodiment.

FIG. 15 is a table showing business card information management information of the business card management server in the embodiment.

FIG. 16 is a table showing privilege identifier management information of the business card management server in the embodiment.

FIG. 22 is a table showing first business card image management information of the business card image acquiring apparatus in the embodiment.

DESCRIPTION OF EMBODIMENTS

Figure 1:
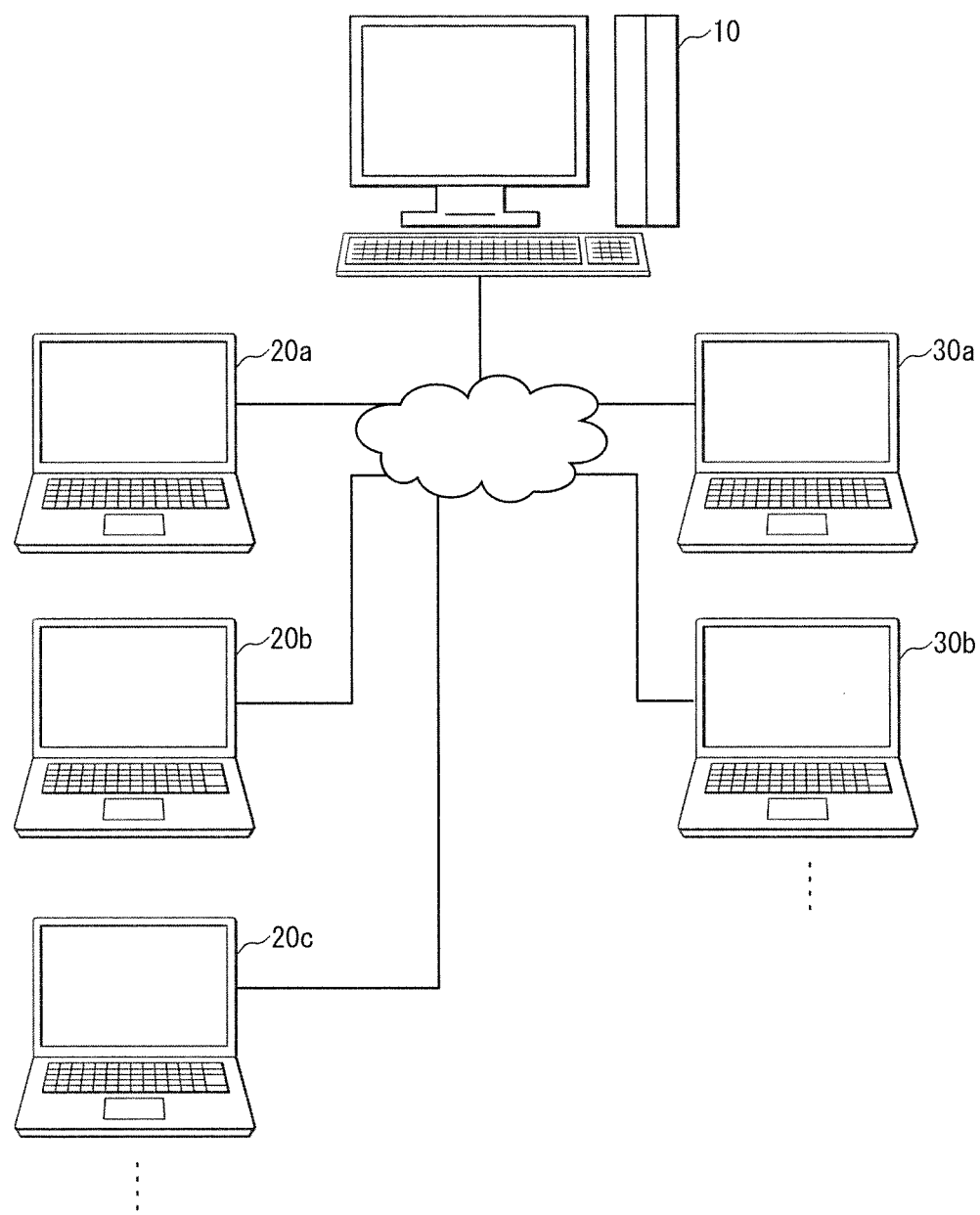
FIG. 1 is a conceptual diagram of a business card management system in Embodiment 1 of the present invention.

Hereinafter, embodiments of a business card management server and the like will be described with reference to the drawings. Note that constituent elements denoted by the same reference numerals perform similar operations in the embodiments, and, thus, a description thereof may not be repeated.

Embodiment 1

FIG. 1 is a conceptual diagram of a business card management system 1 in this embodiment.

The business card management system 1 has one or at least two input terminals 20. It is preferable that the business card management system 1 has two or more input terminals 20. In this embodiment, a case in which the business card management system has two or more input terminals will be described as an example. The business card management system 1 may further have one or more privileged input terminals 30. The privileged input terminals 30 have the same internal configuration as that of the input terminals 20 and can operate also as the input terminals 20, and, thus, they are typically treated as the input terminals 20. Accordingly, the business card management system may have one or more input terminals 20 including the one or more privileged input terminals 30. For example, the business card management system 1 may be configured by one or more input terminals 20 and one or more privileged input terminals 30. A business card management server 10, the input terminals 20, and the privileged input terminal 30 are communicably connected to each other via a network, a communication line, or the like. In this example, a case in which three or more input terminals 20 and two or more privileged input terminal 30 are provided is shown as an example. Note that, for example, the input terminals 20 are respectively denoted by 20a to 20c . . . , and the privileged input terminals 30 are respectively denoted by 30a and 30b . . . .

Figure 2:
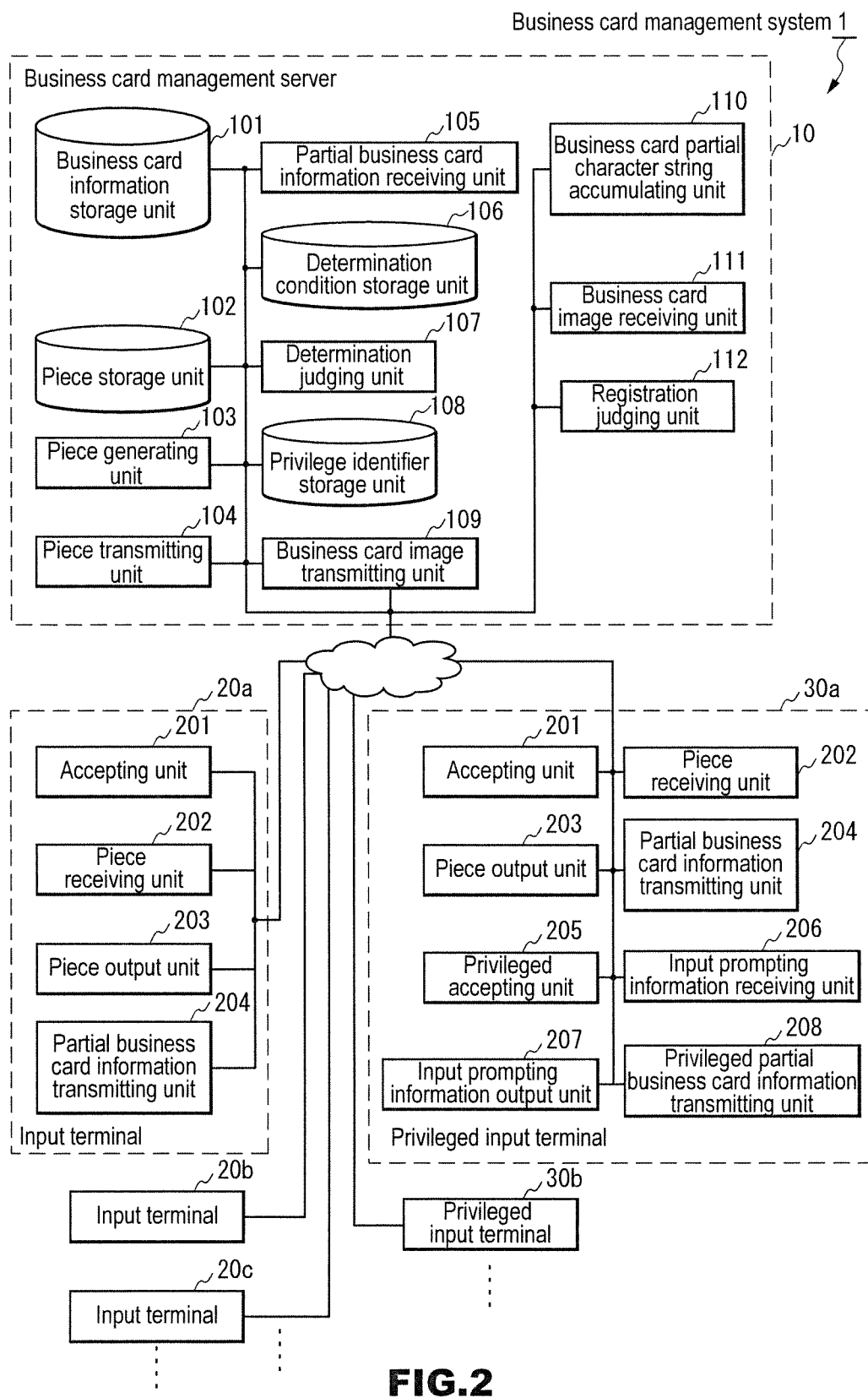
FIG. 2 is a block diagram in the embodiment.

FIG. 2 is a block diagram of the business card management system 1 in this embodiment.

The business card management server 10 includes a business card information storage unit 101, a piece storage unit 102, a piece generating unit 103, a piece transmitting unit 104, a partial business card information receiving unit 105, a determination condition storage unit 106, a determination judging unit 107, a privilege identifier storage unit 108, a business card image transmitting unit 109, a business card partial character string accumulating unit 110, a business card image receiving unit 111, and a registration judging unit 112.

The input terminal 20a includes an accepting unit 201, a piece receiving unit 202, a piece output unit 203, and a partial business card information transmitting unit 204. It is assumed that the other input terminals 20 such as the input terminals 20b and 20c have a configuration similar to that of the input terminal 20a.

The privileged input terminal 30a includes the accepting unit 201, the piece receiving unit 202, the piece output unit 203, the partial business card information transmitting unit 204, a privileged accepting unit 205, an input prompting information receiving unit 206, an input prompting information output unit 207, and a privileged partial business card information transmitting unit 208. It is assumed that the other privileged input terminals 30 such as the privileged input terminal 30b have a configuration similar to that of the privileged input terminal 30a.

The business card management server 10 is a server that manages business card information. The business card management server is realized by, for example, a computer or the like connected to a network, a communication line, or the like.

In the business card information storage unit 101, one or more business card information are stored. The business card information has a business card image and a business card identifier. The business card image is an image of a business card. The business card image is an image of a business card captured by a digital camera, or an image of a business card scanned by a scanner or the like. The business card image is typically an image showing only a business card, but may be an image partially containing a business card. The image partially containing a business card is, for example, an image containing a business card and a background other than the business card, or the like. The image showing only a business card may be, for example, an image of the entire card face of a business card, or an image of the minimum rectangular region including an image or a character string written on a business card. The business card image may further have text data obtained by converting a character string or the like on the business card into text data, using an optical character recognition (OCR) apparatus or the like. There is no limitation on the data format of the business card image.

The business card identifier is information for identifying a business card image. The business card image may be an image having a pair of images of both faces of a business card. The images of both faces of a business card may be respectively treated as separate business card images. The business card identifier may be any information as long as it is information with which a business card image can be identified. The business card identifier is, for example, arbitrary or regular code allocated to a business card, one or more information written on a business card, time and date when an image of a business card was read, time and date when a business card was received, or the like. The business card identifier may be a business card image as it is. In this case, the business card information is information having the business card image, and is not information containing two business card images.

In the business card information storage unit 101, one or at least two business card partial character strings may be further stored in association with the business card identifier and the business card image. Alternatively, in the business card information storage unit 101, two or more pairs of a business card partial character string and item information may be stored in association with the business card identifier and the business card image. The business card partial character string is, for example, a character string indicating information shown on part of a business card image. The item information is, for example, information indicating an item corresponding to information shown on part of a business card image. The item information may be considered as information indicating an item indicated by a business card partial character string. The item is, for example, an item of information written on a business card. The item may be considered as an attribute. The item information is, for example, one or at least two of information such as "full name", "address", "telephone number", "mail address", "company name", "organization name", "department", "position name", "title", and the like. Note that the address and the like may be further divided into multiple information such as "zip code", "address 1", "address 2", and the like.

The business card information storage unit 101 is preferably a non-volatile storage medium, but may be realized also by a volatile storage medium. The storing in this example may be considered as a concept that encompasses temporarily storing. The same is applied to the other storage units.

In the piece storage unit 102, two or more pieces are stored. Each piece is an image in which only part of a business card image is recognizable. The piece is, for example, an image in which only part of information written on a business card, which is shown in one business card image, is recognizable. The information written on a business card is, for example, information such as full name, company name, address, telephone number, mail address, company name, organization name, department, position name, title, or the like.

For example, the part of a business card image that is recognizable from a piece is an image of one of the multiple regions obtained by dividing a region in which characters or images seem to be arranged in one business card image. For example, the part that is recognizable from a piece is a region obtained by dividing a region in which characters seem to be arranged in one business card image, in units of rows, in units of words, in units of blocks in which characters and the like are adjacent to each other, in units of items such as address, full name, or telephone number, or the like. The part of a business card image that is recognizable from a piece is, for example, a portion in which any information in the business card image can be read, such as part of a region including pixels having pixel values other than that of the background color of the business card (i.e., the color of the card face of the business card). For example, if a business card image is a monochrome binary image and the background color (i.e., the color corresponding to the color of the card face) is white, the piece is a region including black pixels. The part that is recognizable from apiece is, for example, a portion including part of an image other than the background in the business card image.

It is preferable that each piece is, for example, information only from which it is impossible or difficult to specify an individual person described on a business card. For example, it is preferable that each piece is an image in which only part of a region is recognizable where information such as full name, address, telephone number, mail address, company name, department, position name, title, or the like is disposed, in one business card image. A state of being recognizable is, for example, a state of being recognizable to human eyes. A state of being recognizable is, for example, a state in which meaning or content can be recognized by humans. A state of being recognizable may be considered as a state in which meaning or content of information shown in a piece can be read by humans.

For example, the piece may be an extracted image obtained by extracting only part of the recognizable portion in a business card image, or may be a masked image in which the region other than part of the recognizable portion in a business card image is masked so as to be unrecognizable. Alternatively, the piece may have both of an extracted image and a masked image. The masked image is, for example, an image in which the region other than part of the recognizable portion is made unrecognizable, by blurring, mosaic or pixelization processing, or fill-in processing with a single color such as white, black, or the background color of the business card, regular or irregular patterns, or pre-designated images, or the like. In the case of performing masking, it is preferable that a positional relationship, a character size relationship, and the like between a recognizable portion of a business card image, and characters or the like shown in a portion that is made unrecognizable by the masking in the business card image can be seen in that business card. For example, it is preferable that the portion that is required to be unrecognizable is subjected to blurring, mosaic, or pixelization processing.

In the piece storage unit 102, two or more pieces are stored for each of one or more business card images. In the piece storage unit 102, for example, two or more pieces, which are images respectively having recognizable portions that are different from each other in a business card image, are stored for each of one or more business card images. It is preferable that the different portions do not overlap each other. Each of one or more business card images is, for example, a business card image stored in the business card information storage unit 101.

A piece of one business card image is typically stored in the piece storage unit 102 in association with a business card identifier of this one business card image. Each piece may be stored in the piece storage unit 102 in association with item information of the image shown by that piece. The item information may be acquired, for example, according to a position in the business card image at which the piece was acquired, a size of the piece, an OCR result of the piece, or the like. The piece identifiers may be any identifiers, for example, as long as pieces corresponding to the same business card image can be at least identified. Note that the piece identifiers may be identifiers with which pieces corresponding to multiple business card images can be identified.

There is no limitation on the procedure in which a piece is accumulated in the piece storage unit 102. For example, a piece may be accumulated in the piece storage unit 102 via a storage medium, or a piece transmitted via a communication line or the like may be accumulated in the piece storage unit 102. In this embodiment, a case in which a piece generated by the piece generating unit 103 is accumulated in the piece storage unit 102 will be described as an example.

The piece generating unit 103 acquires two or more pieces, from each business card image stored in the business card information storage unit 101. The piece generating unit 103 accumulates the acquired two or more pieces in the piece storage unit 102. For example, the piece generating unit 103 accumulates the two or more pieces acquired from the one business card image, in the piece storage unit 102, in association with the one business card image from which the pieces were acquired. For example, the piece generating unit 103 accumulates the two or more pieces acquired from the one business card image, in the piece storage unit 102, in association with a business card identifier of one business card image from which the pieces were acquired.

The piece generating unit 103 may detect two or more mage regions that are to be used as pieces, from each business card image, and extract the image regions, thereby acquiring the pieces. The piece generating unit 103 may divide a business card image, thereby acquiring two or more pieces that are two or more partial images. The piece generating unit 103 may acquire two or more pieces that are two or more masked images obtained by changing the masking position of a business card image.

For example, the piece generating unit 103 scans pixels forming a business card image, in a row direction (i.e., horizontal direction), thereby detecting rows configured only by background pixels and rows containing pixels other than background pixels. The background pixels refer to a portion of a business card where no information is shown. The background pixels are typically pixels indicating a card face portion of a business card. The piece generating unit 103 detects two or more row groups, each of which is configured by one or more successive rows containing pixels other than background pixels and held between two rows configured only by background pixels, and detects the detected two or more row groups, as image regions that are to be used as pieces. The piece generating unit 103 extracts, as pieces, the image regions that are to be used as the pieces, from the business card image. Alternatively, instead of extraction, the piece generating unit 103 may perform masking, on each detected row group, the portion other than the row group in the business card image, and acquire the thus masked images, as pieces. Accordingly, two or more pieces respectively having images of character strings in units of rows can be acquired from a business card in which character strings are arranged in the row direction.

In each of the detected two or more row groups, pixels may be further scanned from both ends, in a column direction (i.e., vertical direction), such that pixel columns containing pixels other than background pixels are sequentially detected, and a column group of an area held between detected two pixel columns may be taken as a piece. The piece generating unit 103 may detect a minimum rectangle including a character string in advance from a business card image, and perform the above-described processing on this rectangle. A region in which a character image seems to be arranged may be detected for each character from a business card image, whether characters on the business card are written in the horizontal direction or the vertical direction may be detected from the arrangement of the detected regions and the like, and the above-described processing for rows and columns may be performed while switching the rows and the columns depending on the detection result. Alternatively, a character string may be detected from the arrangement of the detected character images, and a rectangular region surrounding this character string may be detected as an image region that is to be used as a piece. If the business card image is not a binary image, binarization processing or the like may be performed on the image in advance before pieces are acquired.

The processing that detects regions including character strings in units of rows, and the processing that detects regions in which characters are arranged, from an image containing character images, are known techniques in the OCR processing or the like of business card images, and, thus, a detailed description thereof has been omitted. An example of these techniques is described, for example, in JP 2012-185722A (paragraphs 0048 and 0051, etc.).

The piece generating unit 103 may further acquire piece identifiers for identifying pieces.

Furthermore, if the registration judging unit 112 judges that there is no same business card image, the piece generating unit 103 may acquire two or more pieces from each business card image, and accumulate the two or more pieces in the piece storage unit 102. If there is the same business card image, pieces are acquired from only one of the business card images. Accordingly, pieces can be prevented from being acquired and accumulated from a redundant business card image, and redundant processing can be avoided.

Furthermore, if a business card image contains an image of a background other than the business card, the registration judging unit 112 may detect and extract an image region of the business card portion from the business card image, and judge whether or not the extracted image matches any of the business card images. The processing that detects only the image of the business card portion from the business card image containing the background may be realized, for example, by detecting a boundary between the color of the background of the business card and the color of the portion other than the business card. The processing that detects only the image of the business card portion from the business card image containing the background is a known technique as a technique for managing business cards, and, thus, a detailed description thereof has been omitted.

The piece generating unit 103 may be realized typically by an MPU, a memory, or the like. Typically, the processing procedure of the piece generating unit 103 is realized by software, and the software is stored in a storage medium such as a ROM. Note that the processing procedure may be realized also by hardware (a dedicated circuit).

The piece transmitting unit 104 transmits two or more piece information corresponding to one business card image respectively to different input terminals 20. It is preferable that, for example, the piece transmitting unit 104 transmits two or more piece information corresponding to one business card image respectively to two or more input terminals 20 such that multiple piece information corresponding to the one business card image are not transmitted to one input terminal 20. Note that the piece transmitting unit 104 may transmit two or more piece information corresponding to one business card image respectively to two or more different input terminals 20 such that all of the two or more piece information corresponding to the one business card image are not transmitted to one input terminal 20. For example, if four different piece information A to D are stored in the piece storage unit 102 as piece information corresponding to one business card image, the piece transmitting unit 104 may transmit the piece information A to C to the input terminal 20a, and transmit the piece information D to the input terminal 20d. Alternatively, the piece transmitting unit 104 may transmit the piece information A to C to the input terminal 20a, and transmit the piece information B to D to the input terminal 20d.

The piece information has a piece and a business card identifier corresponding to this piece. Each of two or more piece information corresponding to one business card image has one of different two or more pieces corresponding to the one business card image, and further has a business card identifier for identifying the one business card image. The piece information may have a piece identifier. The piece transmitting unit 104 transmits two or more pieces forming one business card image to different input terminals 20. Since the piece transmitting unit 104 transmits two or more pieces corresponding to one business card image to different input terminals 20, typically, two or more piece information having the same business card identifier are not transmitted to one input terminal 20. Accordingly, an operator using one input terminal 20 can recognize only information on one piece of one business card image, that is, cannot recognize or estimate the whole information in one business card image. Accordingly, disclosure of personal information shown in business card images to operators using the input terminals 20 can be limited to the minimum necessary, and, thus, leakages of the personal information can be prevented.

An operator is an individual person or an organization that inputs a business card partial character string, by operating the input terminal 20. Note that not transmitting to the same input terminal 20 may be considered as not transmitting to the same operator or to a terminal used by the same operator. The input terminal 20 of one operator may be considered as the input terminal 20 that is currently being used or logged on to by the one operator, or as the input terminal that is allocated to the one operator. The input terminals 20 typically refer to input terminals including the privileged input terminals 30, but may be considered not to include the privileged input terminals.

In order to transmit two or more piece information corresponding to one business card image respectively to different input terminals 20, for example, an identifier of each input terminal 20 and a business card identifier contained in the piece information that was transmitted to this input terminal 20 are accumulated in an unshown storage unit or the like in association with each other. When transmitting new piece information from the piece transmitting unit 104 to one input terminal 20, it is judged whether or not any business card identifier of the piece information that was transmitted to this input terminal 20 matches the business card identifier contained in the new piece information that is to be transmitted. The piece transmitting unit 104 may not transmit the piece information to this input terminal 20 in a case where the business card identifiers match each other, and transmit the piece information only in a case where the business card identifiers do not match each other.

The piece transmitting unit 104 may transmit one piece information to multiple input terminals 20.

There is no limitation on the procedure in which the piece transmitting unit 104 determines an input terminal 20 as a transmission destination of each piece information, from among the multiple input terminals 20, as long as multiple piece information corresponding to one business card image are transmitted respectively to different input terminals 20. For example, the piece transmitting unit 104 may select a transmission destination in a predesignated order or at random. The piece transmitting unit 104 may sequentially transmit piece information in response to transmission requests from the input terminals 20.

The piece transmitting unit 104 is realized typically by a wireless or wired communication part, but may be realized also by a broadcasting part. The piece transmitting unit 104 may be considered to include or not to include a communication device.

The partial business card information receiving unit 105 receives partial business card information from the input terminals 20. The partial business card information has a business card identifier and a business card partial character string. The business card partial character string is a character string corresponding to apiece. The business card partial character string is, for example, a character string indicating information shown in a piece. The business card partial character string is, for example, a character string recognized from a character string image shown in a piece. The partial business card information receiving unit 105 may receive partial business card information having a business card identifier, a business card partial character string, and item information, from the input terminals 20. The partial business card information receiving unit 105 may receive partial business card information further having a piece identifier. The partial business card information receiving unit 105 may receive all of partial business card information respectively corresponding to all pieces of a business card image, from the one or at least two input terminals 20.

Furthermore, the partial business card information receiving unit 105 receives partial business card information having a business card identifier and an undetermined business card partial character string, from the privileged input terminals 30. The partial business card information that is received may further have apiece identifier. The partial business card information having an undetermined business card partial character string is referred to as privileged partial business card information. The undetermined business card partial character string is a business card partial character string that is judged by the determination judging unit 107 not to match a determination condition. The partial business card information receiving unit 105 may further receive partial business card information having a determined business card partial character string and a business card identifier, from the privileged input terminals 30.

The partial business card information receiving unit 105 is realized typically by a wireless or wired communication part, but may be realized also by a broadcast receiving part. The partial business card information receiving unit 105 may be considered to include or not to include a communication device.

In the determination condition storage unit 106, a determination condition is stored. The determination condition is a condition for determining the business card partial character strings, and is a condition indicating that business card partial character strings transmitted from the input terminals 20 of at least two or more operators match each other. The determination condition is, for example, a condition that business card partial character strings transmitted from the input terminals 20 of at least N operators (N is an integer of 2 or more, such as 2, 3, etc.) fully match each other, a condition that multiple business card partial character strings have a match rate that is a threshold (e.g., 80%) or more, or a condition that business card partial character strings match each other except for differences in character form (half-width form or fullwidth form). The determination condition may be a condition that at least a threshold number of (e.g., two or more) business card partial character strings among those transmitted from the input terminals 20 of three or more operators fully match each other.

The determination condition storage unit 106 is preferably a non-volatile storage medium, but may be realized also by a volatile storage medium.

If the partial business card information receiving unit receives two or more business card partial character strings of the same item corresponding to one business card identifier from the two or more input terminals 20, the determination judging unit 107 judges whether or not the two or more business card partial character strings match the determination condition. The business card partial character strings of the same item are business card partial character strings associated with the same item information.

The determination judging unit 107 may be realized typically by an MPU, a memory, or the like. Typically, the processing procedure of the determination judging unit 107 is realized by software, and the software is stored in a storage medium such as a ROM. Note that the processing procedure may be realized also by hardware (a dedicated circuit).

In the privilege identifier storage unit 108, a privilege identifier is stored. The privilege identifier is information for communicating with the privileged input terminal 30 of a privileged operator. The privileged operator is an operator who can view a business card image corresponding to a business card identifier contained in the partial business card information. The privileged operator is, for example, an operator specialized or qualified to protect personal information, secrets, and security, an operator who has made a legitimate contract regarding protection of personal information and secrets with a company or the like operating the business card management system 1, an operator who has made a contract for at least a number of years corresponding to a threshold, or the like.

The business card image corresponding to a business card identifier is, for example, a business card image corresponding to a piece but without masking, or a business card image before extraction of a piece. The business card image is a business card image stored in the business card information storage unit 101. The privilege identifier may be any information with which communications with a privileged operator eventually become possible, and examples thereof include a user identifier, a mail address, an account of a messaging service, an account of an SNS (social networking service, etc.), and the like of the privileged operator. The privilege identifier may be considered as an identifier of the privileged input terminal 30.

The privilege identifier storage unit 108 is preferably a non-volatile storage medium, but may be realized also by a volatile storage medium.

If the determination judging unit 107 judges that a business card partial character string corresponding to at least part of items of one business card image is undetermined, the business card image transmitting unit 109 transmits input prompting information and a business card identifier of this one business card image, to the privileged input terminal 30. The business card image transmitting unit 109 may further transmit item information of an item corresponding to the undetermined business card partial character string. The business card image transmitting unit 109 may further transmit a piece identifier of a piece corresponding to the undetermined business card partial character string. The input prompting information is information for prompting input of the undetermined business card partial character string. The input prompting information is, for example, a piece corresponding to the undetermined business card partial character string. The input prompting information may be a business card image without masking or the like from which the pieces were acquired. The input prompting information may have, for example, item information corresponding to the undetermined business card partial character string. The input prompting information is typically information for prompting input of the undetermined business card partial character string of one business card image, but may be information for prompting input of character strings of all information (e.g., character strings) shown in one business card image or portions also including determined business card partial character strings. The privileged input terminals 30 are the input terminals 20 identified with the privilege identifiers. Note that part of items refers to items indicated by the item information other than that associated with business card partial character strings judged by the determination judging unit 107 to match the determination condition, among one or more item information indicating items that are to be acquired from the business card image.

For example, when a predetermined period of time or longer has passed after the piece transmitting unit 104 transmits piece information having one business card identifier and the like, the business card image transmitting unit 109 judges whether or not the business card partial character string corresponding to part of item information associated with this business card identifier is stored in the business card information storage unit 101. If it is not stored, the business card image transmitting unit 109 transmits input prompting information and the business card identifier, with respect to this item information.

Furthermore, if the determination judging unit 107 judges that two or more business card partial character strings of the same item corresponding to one business card identifier do not match each other, the business card image transmitting unit 109 may transmit input prompting information and a business card identifier, with respect to the item information of this item.

If there are multiple privileged input terminals 30, there is no limitation on the procedure in which the business card image transmitting unit 109 determines a privileged input terminal 30 as a transmission destination of input prompting information and a business card identifier. For example, the business card image transmitting unit 109 may determine the privileged input terminal 30 in a predesignated order, according to a predesignated rule, or at random.

A piece acquired by the piece generating unit 103 may be provided with a piece identifier, the piece transmitting unit 104 may transmit the piece identifier together with the piece to the input terminal 20, and the input terminal 20 may transmit partial business card information having the piece identifier. In this case, if a business card partial character string corresponding to part of piece identifiers is undetermined, the business card image transmitting unit 109 may judge that the business card partial character string corresponding to an item corresponding to the piece corresponding to this piece identifier is undetermined.

The business card image transmitting unit 109 is realized typically by a wireless or wired communication part, but may be realized also by a broadcasting part. The business card image transmitting unit 109 may be considered to include or not to include a communication device.

The business card partial character string accumulating unit 110 accumulates the business card partial character string received by the partial business card information receiving unit 105, in the business card information storage unit 101, in association with the business card identifier received by the partial business card information receiving unit 105. The business card partial character string accumulating unit 110 may accumulate the business card partial character string received by the partial business card information receiving unit 105, in the business card information storage unit 101, in association with the business card identifier and the item information received by the partial business card information receiving unit 105.

The business card partial character string accumulating unit 110 may determine the business card partial character strings, only in a case where the determination judging unit 107 judges that the business card partial character strings match the determination condition. The determining a business card partial character string is processing that accumulates the business card partial character string received by the partial business card information receiving unit 105, in the business card information storage unit 101, in association with the business card identifier or the business card identifier and the item information received by the partial business card information receiving unit 105. This processing may be processing that writes a flag indicating the state of being determined, to the business card partial character string accumulated in the business card information storage unit 101, for example.

The business card partial character string accumulating unit 110 accumulates the business card partial character string contained in the privileged partial business card information received by the partial business card information receiving unit 105, in the business card information storage unit 101, in association with the business card identifier contained in the privileged partial business card information received by the partial business card information receiving unit 105. The business card partial character string accumulating unit 110 may accumulate the business card partial character string received by the partial business card information receiving unit 105, in the business card information storage unit 101, in association with the business card identifier and the item information received by the partial business card information receiving unit 105. In a similar manner, the business card partial character string accumulating unit 110 may accumulate the business card partial character string contained in the partial business card information corresponding to the determined business card partial character string received from the privileged input terminal 30, in the business card information storage unit 101. In this case, the accumulating is, for example, overwriting.

The business card image receiving unit 111 receives a business card image. For example, business card images transmitted via a network, a communication line, or the like from unshown information processing terminals used by one or more users are received. The user is, for example, a user who is asked to manage business cards or to register information on business cards, or the like. The information processing terminal (not shown) used by the user is, for example, for example, a computer, a mobile phone, a portable information terminal, a tablet terminal, a smartphone, or the like. It is preferable that the information processing terminal has a camera that can acquire business card images, or is connected to a scanner that can acquire business card images.

For example, the business card image receiving unit 111 accumulates the received business card image, in the business card information storage unit 101, in association with a business card identifier. There is no limitation on the procedure in which the business card identifier that is accumulated is set, and, for example, it may be determined according to a predesignated rule or the like. For example, the business card image receiving unit 111 may sequentially provide serial numbers. The business card image receiving unit 111 may use file names or the like of the received business card images, the time and date when the business card images were received, as business card identifying information. The business card image receiving unit 111 may accumulate the received business card image in the business card information storage unit 101, only in a case where the registration judging unit 112 judges that the same business card image is not stored in the business card information storage unit 101.

Furthermore, the business card image receiving unit 111 may perform processing that removes the above-described background portion other than a business card from the received business card image, and processing that, after the removal, changes the shape of the business card into a predesignated shape such as a rectangle. The business card image receiving unit 111 may perform processing that converts the business card image into a binary image or a grayscale image, or the like. The business card image receiving unit 111 may accumulate the business card image obtained by performing these sorts of processing, in the business card information storage unit 101, or may use the business card image obtained by performing these sorts of processing to cause the registration judging unit 112 to perform the judgment processing or to cause the piece generating unit 103 to generate pieces.

The business card image receiving unit 111 is realized typically by a wireless or wired communication part, but may be realized also by a broadcast receiving part. The business card image receiving unit 111 may be considered to include or not to include a communication device. The business card image receiving unit 111 may have an MPU, a memory, or the like, in order to perform processing that changes the shape of the business card image and the like. Typically, the processing procedure thereof is realized by software, and the software is stored in a storage medium such as a ROM. Note that the processing procedure may be realized also by hardware (a dedicated circuit).

The registration judging unit 112 judges whether or not the same business card image as the business card image received by the business card image receiving unit 111 is stored in the business card information storage unit 101. There is no limitation on the procedure in which the registration judging unit 112 judges whether or not business card images are the same. For example, the registration judging unit 112 performs processing that changes the shape of at least one of the two business card images that are to be compared, taken from the business card images stored in the business card information storage unit 101, such that they have the same pixel number and the same shape, and, then, binarizes the two business card images. The registration judging unit 112 may judge, for each pixel, whether or not the values of the pixels at the same coordinates match each other, and, if the ratio of matching pixels, that is, the match rate is at least a predesignated threshold, may judge that the two business card images match each other. The binarization may be performed before changing the shape. Above, a case was described in which business card images are binarized and whether or not two pixels match each other is judged, but this comparison processing is merely an example, and it is also possible that pixels of business card images are compared without performing binarization, and pixels having similar color differences, tones, or the like (e.g., pixels in which a difference between the values of color differences or tones is less than a threshold) may be judged to match each other. Alternatively, other processing may be performed as the processing that judges whether or not pixels match each other. The same is applied to other processing that compares pixels of two images. In this example, processing that judges whether or not pixels do not match each other using a mismatch rate is considered to be substantially the same processing. It is also possible that characters contained in two business card images that are to be compared are converted into text by OCR processing or the like, and, if the text match rate is at least a predesignated threshold, the images are judged to match each other.

If the piece generating unit 103 judges whether or not there is the same business card image, and acquires two or more pieces from a business card image in the case of judging that there is no same business card image, the registration judging unit 112 may be omitted.

The input terminals 20a to 20c are information processing terminals that input information on a business card. The input terminals 20a to 20c may be considered as information processing terminals that output the input information on a business card or the like. The output is, for example, transmission to the business card management server 10, or accumulation in an unshown storage unit or the like. The input terminals 20a to 20c may be realized, for example, by a computer, a mobile phone, a portable information terminal, a tablet terminal, a smartphone, or the like.

The accepting unit 201 accepts input of an operator who inputs a business card partial character string. For example, the accepting unit 201 accepts input of a business card partial character string, in each piece output by the piece output unit 203. The accepting unit 201 may further accept item information indicating an item of the business card partial character string. The accepting unit 201 may accept multiple item information with respect to one business card partial character string. The item information that is accepted with respect to one business card partial character string is, for example, one or at least two of item information indicating items that are to be acquired from the information shown in the business card image. The item information may be one or more data selected from master data or the like of the item information prepared in advance.

The accepting is a concept that encompasses accepting information input from an input device such as a keyboard, a mouse, or a touch panel, and receiving information transmitted via a wired or wireless communication line. The business card partial character string may be input by any part such as a touch panel, a keyboard, a mouse, a menu screen, or the like. The accepting unit 201 may be realized by a device driver for an input part such as a touch panel or a keyboard, control software for a menu screen, or the like.

The piece receiving unit 202 receives the piece information from the business card management server 10. The piece receiving unit 202 may receive piece information that is transmitted from the business card management server 10, in response to information requesting transmission of piece information that is transmitted according to an instruction of the operator or the like. Furthermore, piece information that is transmitted from the business card management server 10 at a predesignated point in time or trigger may be received. The piece receiving unit 202 is realized typically by a wireless or wired communication part, but may be realized also by a broadcast receiving part. The piece receiving unit 202 may be considered to include or not to include a communication device.

The piece output unit 203 outputs the piece contained in the piece information received by the piece receiving unit 202. It is preferable that the piece output unit 203 does not output (e.g., display) the business card identifier contained in the piece information so as to be recognizable to the operator. The output is a concept that encompasses display on a display screen, projection using a projector, printing in a printer, transmission to an external apparatus, accumulation in a storage medium, delivery of a processing result to another processing apparatus or another program, and the like. The piece output unit 203 may be considered to include or not to include an output device such as a display screen. The piece output unit 203 may be realized, for example, by driver software for an output device, a combination of driver software for an output device and the output device, or the like.

The partial business card information transmitting unit 204 transmits partial business card information having the business card partial character string accepted by the accepting unit 201 and the business card identifier received by the piece receiving unit 202, to the business card management server 10. For example, the partial business card information transmitting unit 204 transmits partial business card information having the business card partial character string accepted by the accepting unit 201 with respect to apiece output by the piece output unit 203 and the business card identifier received by the piece receiving unit 202 with respect to the piece, to the business card management server 10. The business card identifier received by the piece receiving unit 202 is the business card identifier contained in the piece information received by the piece receiving unit 202. The partial business card information transmitting unit 204 may transmit partial business card information having a pair of the business card partial character string and the item information accepted by the accepting unit 201 and the business card identifier received by the piece receiving unit 202, to the business card management server 10. For example, the partial business card information transmitting unit 204 transmits partial business card information having a pair of the business card partial character string and the item information accepted by the accepting unit 201 with respect to a piece output by the piece output unit 203 and the business card identifier received by the piece receiving unit 202 with respect to the piece, to the business card management server 10. The partial business card information transmitting unit 204 may further transmit partial business card information having a piece identifier contained in the piece information received by the piece receiving unit 202.

The partial business card information transmitting unit 204 is realized typically by a wireless or wired communication part, but may be realized also by a broadcasting part. The partial business card information transmitting unit 204 may be considered to include or not to include a communication device.

The privileged input terminals 30a and 30b are information processing terminals that input information on a business card, and that correspond to privilege identifiers. The privileged input terminals 30 may be realized, for example, by a computer, a mobile phone, a portable information terminal, a tablet terminal, a smartphone, or the like.

The accepting unit 201, the piece receiving unit 202, the piece output unit 203, and the partial business card information transmitting unit 204 of each of the privileged input terminals 30a and 30b have configurations similar to those of the input terminals 20a to 20c.

The privileged accepting unit 205 accepts input of a privileged operator who inputs an undetermined business card partial character string. The privileged accepting unit 205 accepts input from the privileged operator, in response to the input prompting information output by the input prompting information output unit 207. The input accepted by the privileged accepting unit 205 is specifically a business card partial character string corresponding to the undetermined business card partial character string. The business card partial character string accepted by the privileged accepting unit 205 is, for example, similar to the business card partial character string accepted by the accepting unit 201. The privileged accepting unit 205 may accept a business card partial character string corrected by the privileged operator. The privileged accepting unit 205 may further accept input of item information, which is information indicating an item of the undetermined business card partial character string. The privileged accepting unit 205 has a configuration similar to that of the accepting unit 201.

The privileged accepting unit 205 may further accept input from the privileged operator with respect to one or at least two determined business card partial character strings in the business card image indicated by the input prompting information. This input may be considered as input that corrects the determined business card partial character strings.

The input prompting information receiving unit 206 receives input prompting information and a business card identifier from the business card management server 10. The input prompting information receiving unit 206 may further receive item information of an item corresponding to the undetermined business card partial character string. The input prompting information receiving unit 206 may further receive piece identifier of a piece corresponding to the undetermined business card partial character string. The input prompting information receiving unit 206 has a configuration similar to that of the piece receiving unit 202.

The input prompting information output unit 207 outputs the input prompting information received by the input prompting information receiving unit 206. The output is a concept that encompasses display on a display screen, projection using a projector, printing in a printer, transmission to an external apparatus, accumulation in a storage medium, delivery of a processing result to another processing apparatus or another program, and the like. The input prompting information output unit 207 may be considered to include or not to include an output device such as a display screen. The input prompting information output unit 207 may be realized, for example, by driver software for an output device, a combination of driver software for an output device and the output device, or the like.

The privileged partial business card information transmitting unit 208 transmits partial business card information having the business card partial character string accepted by the privileged accepting unit 205 and the business card identifier received by the input prompting information receiving unit 206, to the business card management server 10. In this partial business card information, partial business card information having a business card partial character string corresponding to the undetermined business card partial character string is the privileged partial business card information. The privileged partial business card information transmitting unit 208 may transmit partial business card information having the business card partial character string and the item information accepted by the privileged accepting unit 205 and the business card identifier received by the input prompting information receiving unit 206, to the business card management server 10. The privileged partial business card information transmitting unit 208 may transmit privileged partial business card information that is partial business card information further having the piece identifier received by the input prompting information receiving unit 206.

The privileged partial business card information transmitting unit 208 is realized typically by a wireless or wired communication part, but may be realized also by a broadcasting part. The privileged partial business card information transmitting unit 208 may be considered to include or not to include a communication device.

Figure 3:
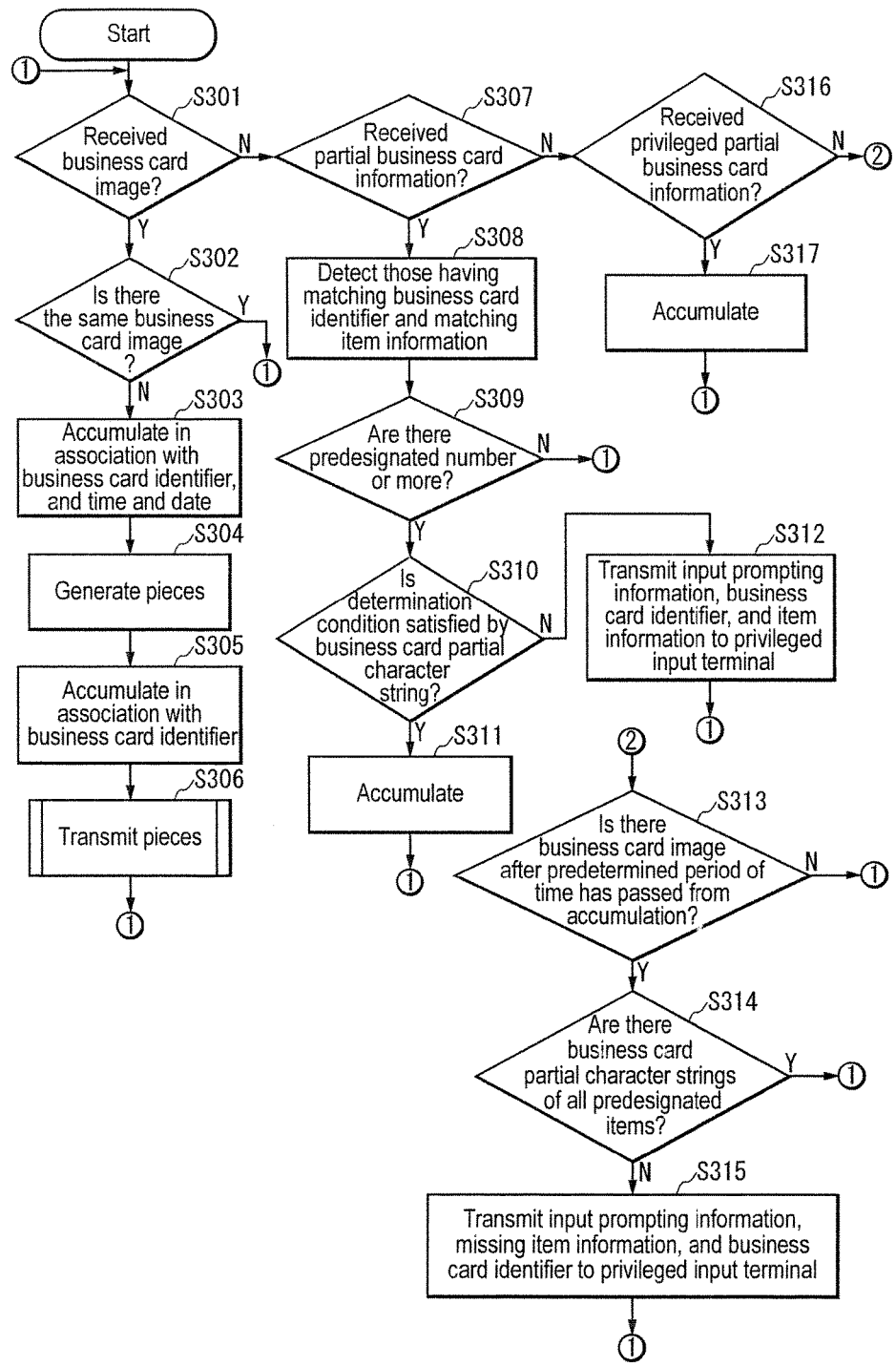
FIG. 3 is a flowchart illustrating an operation of a business card management server in the embodiment.

FIG. 3 is a flowchart illustrating an operation of the business card management server 10 of the business card management system 1 according to this embodiment.

(Step S301) The business card image receiving unit 111 judges whether or not one business card image has been received. If it has been received, the procedure advances to step S302, and, if not, the procedure advances to step S307.

(Step S302) The registration judging unit 112 judges whether or not the same business card image is stored in the business card information storage unit 101. If the same business card image is not stored, the procedure advances to step S303, and, if the same business card image is stored, the business card information associated with the same business card image is duplicated, and is accumulated in the business card information storage unit 101 as business card information corresponding to the received business card image. The procedure returns to step S301. Note that, in order to prevent registration of a redundant business card image, the received business card image may be discarded, after which the procedure may return to step S301.

(Step S303) The business card image receiving unit 111 accumulates the business card image received in step S301, in the business card information storage unit 101, in association with the business card identifier. In this example, information on the time and date when the business card image is accumulated is acquired from a clock (not shown) or the like and is further accumulated.

(Step S304) The piece generating unit 103 generates different two or more pieces, using the one business card image received in step S301.

(Step S305) The piece generating unit 103 accumulates the generated two or more pieces, in the piece storage unit 102, in association with the business card identifier accumulated in step S303. The piece generating unit 103 may accumulate the generated two or more pieces further in association with piece identifiers. For example, the piece generating unit 103 sets the piece identifiers according to a predesignated rule or the like. This rule is, for example, a rule that serial numbers are provided as piece identifiers, a rule that the times when pieces were generated or the like are provided as piece identifiers, a rule that values indicating the arrangement order of the positions at which pieces were acquired in a business card image, or the like are provided as piece identifiers.

(Step S306) The piece transmitting unit 104 transmits piece information respectively having the pieces acquired in step S305 and the business card identifier associated with the pieces, to the input terminals 20. The processing that transmits the piece information will be described later in detail.

(Step S307) The partial business card information receiving unit 105 judges whether or not partial business card information has been received from the input terminal 20. If the partial business card information has been received by the partial business card information receiving unit 105, it is accumulated in an unshown storage medium or the like, and the procedure advances to step S308. If not, the procedure advances to step S316.

(Step S308) The determination judging unit 107 detects partial business card information having a business card identifier and item information matching those contained in the partial business card information accepted in step S307, from among the already received partial business card information. For example, partial business card information having a business card identifier and item information matching those contained in the partial business card information accepted in step S307 is searched for, in an unshown storage unit in which the partial business card information receiving unit 105 accumulates the received partial business card information.

(Step S309) The determination judging unit 107 judges whether or not at least a predesignated number of partial business card information each having a matching business card identifier and matching item information are detected. The predesignated number is, for example, 1 or more excluding the partial business card information accepted in step S307. The predesignated number is typically a value obtained by subtracting the number of partial business card information accepted in step S307, that is, 1, from the number of input terminals 20 to which one set of piece information was transmitted in step S306. If at least the predesignated number of partial business card information are detected, the procedure advances to step S310, and, if not, the procedure advances to step S301.

(Step S310) The determination judging unit 107 reads the determination condition stored in the determination condition storage unit 106, and judges whether or not the read determination condition is satisfied by the business card partial character string contained in the partial business card information received in step S307 and the business card partial character string contained in the partial business card information detected in step S308. If the determination condition is satisfied, the procedure advances to step S311, and, if not, the procedure advances to step S312.

(Step S311) The business card partial character string accumulating unit 110 accumulates the business card partial character string, the business card identifier, and the item information contained in the partial business card information received in step S307, in association with each other, in the business card information storage unit 101. The procedure returns to step S301.

(Step S312) The business card image transmitting unit 109 acquires one privilege identifier from the privilege identifier storage unit 108, and transmits input prompting information corresponding to the partial business card information received in step S307, and the business card identifier and the item information contained in the partial business card information, to the privileged input terminal 30 indicated by the acquired privilege identifier. The input prompting information is, for example, a business card image corresponding to the business card identifier contained in the partial business card information. If there are multiple privilege identifiers in the privilege identifier storage unit 108, there is no limitation on the procedure in which the determination judging unit 107 selects one privilege identifier. For example, the business card image transmitting unit 109 may sequentially select one privilege identifier in a predesignated order, or may select a privilege identifier at random. The procedure returns to step S301.

(Step S313) The business card image transmitting unit 109 judges whether or not a business card image after a predetermined period of time has passed from the time and date when the accumulation was performed is stored in the business card information storage unit 101. If the image is stored, the procedure advances to step S314, and, if not, the procedure returns to step S301. Note that a business card image for which business card partial character string corresponding to all of predesignated item information have been already accumulated in the business card information storage unit 101 may be provided with a flag or the like when the partial business card character strings of all items were accumulated, so that this business card image can be excluded from the judgment targets in this step.

(Step S314) The business card image transmitting unit 109 judges whether or not business card partial character strings of all predesignated items are stored with respect to the business card image after the predetermined period of time has passed detected in step S313. If they are not stored, the procedure advances to step S315, and, if they are stored, the procedure returns to step S301.

(Step S315) The business card image transmitting unit 109 acquires one privilege identifier from the privilege identifier storage unit 108, and transmits input prompting information corresponding to the business card image detected in step S313, missing item information of this business card image, and the business card identifier of this business card image, to the privileged input terminal 30 indicated by the acquired privilege identifier. The procedure returns to step S301.

(Step S316) The partial business card information receiving unit 105 judges whether or not privileged partial business card information has been received. If it has been received, the procedure advances to step S317, and, if not, the procedure returns to step S301.

(Step S317) The partial business card information receiving unit 105 accumulates the business card partial character string, the business card identifier, and the item information contained in the received privileged partial business card information, in association with each other, in the business card information storage unit 101. The procedure returns to step S301.

If the business card image receiving unit 111 receives a business card image containing a portion other than the business card portion (e.g., receives a business card image containing an image of the background portion other than the business card, etc.), the business card image receiving unit 111 may perform processing that acquires a business card image obtained by extracting only the image of the business card portion from the business card image.

Note that the procedure is terminated by powering off or an interruption at completion of the process in the flowchart in FIG. 3.

Figure 4:
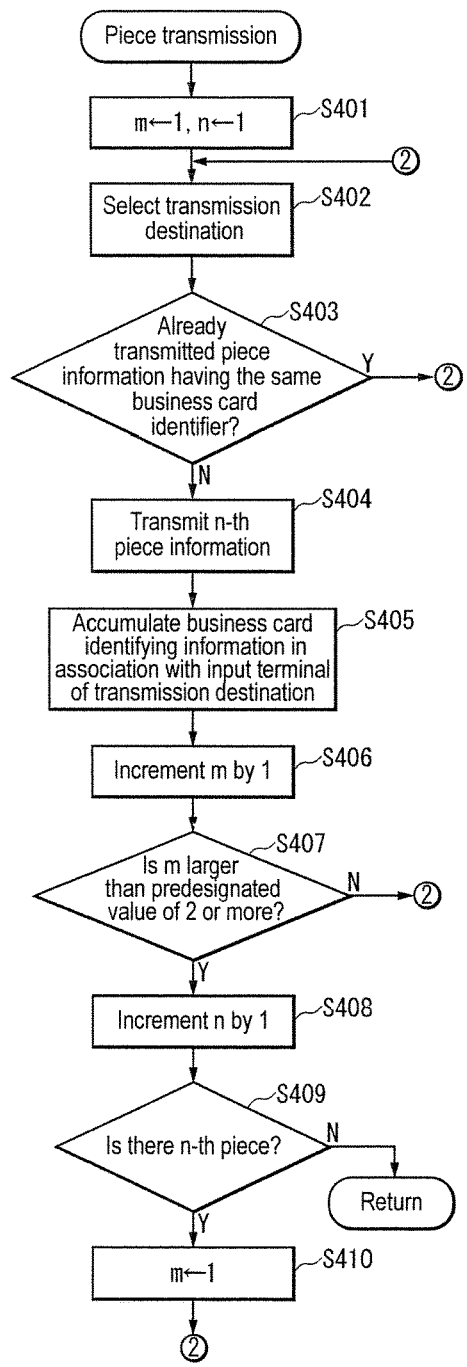
FIG. 4 is a flowchart illustrating the details of the operation of the business card management server in the embodiment.

FIG. 4 is a flowchart illustrating the details of the operation in which the business card management server 10 of the business card management system 1 according to this embodiment transmits the pieces generated in step S304. This flowchart shows a step corresponding to step S306 in FIG. 3.

(Step S401) The piece transmitting unit 104 substitutes 1 for a counter m and a counter n.

(Step S402) The piece transmitting unit 104 selects an input terminal 20 as a transmission destination of the piece information. In this example, the privileged input terminals 30 are also considered as the input terminals 20. For example, the piece transmitting unit 104 selects one of the input terminal identifiers stored in advance in an unshown storage unit. The input terminal 20 corresponding to this input terminal identifier is the selected input terminal 20. The input terminal identifier is an identifier for identifying an input terminal 20 that can be selected as transmission destination of the piece information. The input terminal identifier is, for example, access code, a mail address, an IP address, a MAC address, or the like of the input terminal 20. The input terminal identifier may be any information with which communications with an operator of the input terminal 20 eventually become possible, and examples thereof include a user identifier, a mail address, an account of a messaging service, an account of an SNS (social networking service, etc.), and the like of the operator of the input terminal 20. The input terminal identifier may be an account of a messaging service, an account of an SNS (social networking service, etc.), or the like.

(Step S403) The piece transmitting unit 104 judges whether or not there is piece information having the same business card identifier as any of the business card identifiers associated with the pieces generated in step S304 in FIG. 3, among the piece information previously transmitted to by the input terminal 20 indicated by the input terminal identifier selected in step S402. For example, each time the piece transmitting unit 104 transmits piece information, the business card identifier contained in the transmitted piece information and the input terminal identifier of the input terminal functioning as the transmission destination are accumulated in association with each other in an unshown storage unit. In this state, it is judged whether or not there is information having the input terminal identifier selected in step S402 and any of the business card identifiers associated with the pieces generated in step S304 in FIG. 3, among the accumulated information. If there is piece information having the same business card identifier, among the previously transmitted piece information, the procedure returns to step S402, and, if not, the procedure advances to step S404. Accordingly, pieces associated with the same business card identifier can be prevented from being transmitted to one input terminal 20.

(Step S404) The piece transmitting unit 104 transmits piece information having an n-th piece generated in step S304 in FIG. 3 and the business card identifier associated with this piece, to the input terminal 20 indicated by the input terminal identifier selected in step S402.

(Step S405) The piece transmitting unit 104 accumulates the input terminal identifier of the input terminal 20 functioning as the transmission destination and the business card identifier contained in the transmitted piece information in the unshown storage unit.

(Step S406) The piece transmitting unit 104 increments the counter m by 1.

(Step S407) The piece transmitting unit 104 judges whether or not the value of the counter m exceeds a predesignated value of 2 or more. The value obtained by subtracting 1 from the value of the counter m is the number of input terminals 20 to which one piece was transmitted. That is Co say, in this example, a case in which one set of piece information is transmitted to two or more input terminals 20 is described as an example. If the value exceeds the predesignated value, the procedure advances to step S408, and, if not, that is, if the value is the predesignated value or less, the procedure returns to step S402.

(Step S408) The piece transmitting unit 104 increments the counter n by 1.

(Step S409) The piece transmitting unit 104 judges whether or not there is an n-th piece in the pieces generated in step S304 in FIG. 3. If there is, the procedure advances to step S410, and, if not, the procedure returns to the upper-level processing.

(Step S410) The piece transmitting unit 104 substitutes 1 for the counter m. The procedure returns to step S402.

In the piece transmitting processing described with reference to the flowchart in FIG. 4, the piece transmission is ended if a predesignated number of pieces have been transmitted for each piece. However, the piece transmitting unit 104 may repeat the piece transmission until the partial business card information corresponding to the transmitted pieces is determined or for a predesignated period of time. For example, in step S313 in the flowchart in FIG. 3, if it is judged that there is no business card image after a predetermined period of time has passed, the piece transmitting unit 104 or the like may detect a piece whose corresponding partial business card information is undetermined, from among the pieces transmitted by the piece transmitting unit 104, and, if an undetermined piece is detected, the piece transmitting unit 104 may again transmit that piece. After the piece is transmitted or if no undetermined piece is detected, the procedure may return to step S301.

Figure 5:
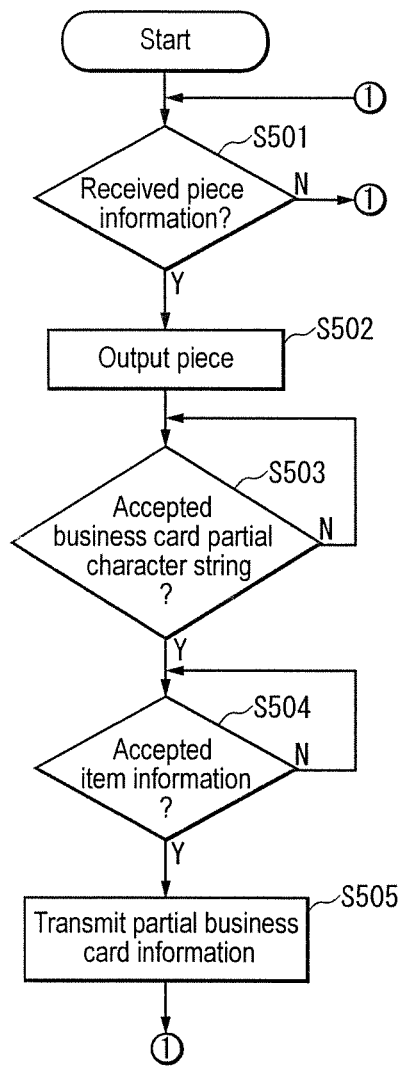
FIG. 5 is a flowchart illustrating an operation of an input terminal in the embodiment.

FIG. 5 is a flowchart illustrating an operation of the input terminal 20 of the business card management system 1 according to this embodiment.

(Step S501) The piece receiving unit 202 judges whether or not piece information has been received. If it has been received, the procedure advances to step S502, and, if not, the procedure returns to step S501.

(Step S502) The piece receiving unit 202 outputs the piece contained in the piece information.

(Step S503) The accepting unit 201 judges whether or not a business card partial character string has been accepted. If it has been accepted, the procedure advances to step S504, and, if not, the procedure returns to step S503.

(Step S504) The accepting unit 201 judges whether or not item information has been accepted. If it has been accepted, the procedure advances to step S505, and, if not, the procedure returns to step S504.

(Step S505) The partial business card information transmitting unit 204 transmits partial business card information having the business card partial character string accepted in step S503, the item information accepted in step S504, and the business card identifier contained in the piece information received in step S501, to the business card management server 10. The procedure returns to step S501.

Note that the procedure is terminated by powering off or an interruption at completion of the process in the flowchart in FIG. 5.

Figure 6:
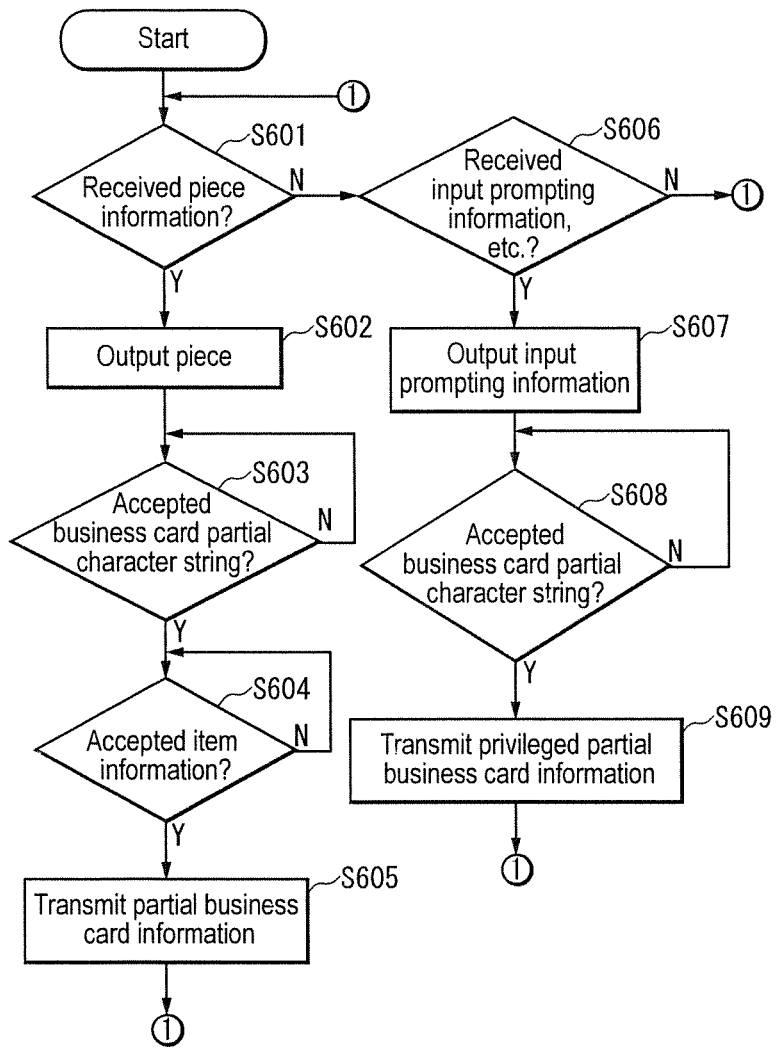
FIG. 6 is a flowchart illustrating an operation of a privileged input terminal in the embodiment.

FIG. 6 is a flowchart illustrating an operation of the privileged input terminal 30 of the business card management system 1 according to this embodiment. In the flowchart, steps S601 to S605 are the same as or correspond to steps S501 to S505 respectively in the flowchart in FIG. 5, and, thus, in this example, a detailed description thereof has been omitted.

(Step S606) The input prompting information receiving unit 206 judges whether or not input prompting information and a business card identifier have been received. If they have been received, the procedure advances to step S607, and, if not, the procedure returns to step S601.

(Step S607) The input prompting information output unit 207 outputs the input prompting information received in step S606.

(Step S608) The privileged accepting unit 205 judges whether or not a business card partial character string has been accepted. If it has been accepted, the procedure advances to step S609, and, if not, the procedure returns to step S608. The privileged accepting unit 205 may accept multiple business card partial character string.

(Step S609) The privileged partial business card information transmitting unit 208 transmits privileged partial business card information having the business card partial character string accepted in step S608, the item information accepted in step S607 with respect to each business card partial character string, and the business card identifier received in step S606, to the business card management server 10. The procedure returns to step S601.

Note that the procedure is terminated by powering off or an interruption at completion of the process in the flowchart in FIG. 6.

Hereinafter, a specific operation of the business card management system 1 in this embodiment will be described. A conceptual diagram of the business card management system 1 is shown in FIG. 1.

It is assumed that a user who wants to manage business cards captures an image of a business card using a digital camera-attached smartphone (not shown), and transmits a business card image obtained by the image capturing, to the business card management server 10. The business card image is transmitted to the business card management server 10, for example, in association with a user identifier of the user who transmitted the business card image. It is assumed that the file name of the transmitted business card image is "U001NAME12.png" and the user identifier is "U001".

The business card image receiving unit 111 of the business card management server 10 receives a pair of the business card image and the user identifying information transmitted from the user. The business card image receiving unit 111 binarizes the received business card image with the file name being "U001NAME12.png" (hereinafter, referred to as a business card image "U001NAME12.png"), and further detects a contour of a rectangular region showing the business card. An image in this rectangular region is extracted, and its shape is changed into a rectangle having the numbers of vertical and horizontal pixels that are the same as those of the business card.

Figure 7A:
FIG. 7 is a view showing shape change processing on a business card image (FIG. 7($a$)), and a view showing an extracted business card image (FIG. 7($b$)), according to the business card management server in the embodiment.
Figure 7B:

FIG. 7 shows a change in the shape of a business card image, where FIG. 7(a) shows a state in which a rectangular region 71 showing the business card is detected from the binarized business card image, and FIG. 7(b) shows a business card image obtained by extracting the rectangular region 71 and changing its shape into a rectangle.

FIG. 8 is a table showing business card image management information for managing business card images stored in the business card information storage unit 101. The business card image management information has the attributes "business card ID", "user ID", "image", and "date". In the table, "business card ID" is a business card identifier, "user ID" is a user identifier of a user who transmitted a business card image, "image" is a file name of a business card image, and "date" is a date at which a business card image was accumulated. The attribute "date" may further have information such as time in addition to the date. It is assumed that the business card images stored in the business card information storage unit 101 are business card images whose shapes have been changed as described above by the business card image receiving unit 111 or the like.

The registration judging unit 112 judges whether or not a business card image matching the business card image "U001NAME12.png" received and subjected to shape change processing by the business card image receiving unit 111 is stored in the business card information storage unit 101. For example, the registration judging unit 112 judges whether or not there is a matching business card image, among the business card images stored in association with the user identifier matching the user ID "U001" received together with the business card image. In this example, a case is shown in which a business card image is binarized, but binarization does not always have to be performed. If binarization is not performed, it may be judged whether or not business card images match each other, for example, as follows. That is to say, if a difference between the values of color differences or tones is less than a predesignated value, it is judged that the pixels of the two business card images match each other, and, if the difference is the predesignated value or more, it is judged that the pixels do not match each other. The threshold may be a fixed value, or may be a variable value that is determined according to a value of the whole or part of pixels of the business card image or the like. Note that the contour of a rectangular region of a business card may be detected using the values of color differences or tones.

The registration judging unit 112 sequentially detects records with the values of "user ID" matching "U001", from the business card image management information shown in FIG. 8, and acquires business card images with the file names indicated in "image" contained in the detected records. Then, it is judged whether or not each of the business card images matches the business card image subjected to the shape change processing shown in FIG. 7(*b*). For example, it is judged whether or not the pixel values of pixels at the same coordinates match each other between business card images that are to be compared, and, if the match rate is at least a predesignated threshold, it is judged that the business card images match each other. If the match rate is less than the threshold, the registration judging unit 112 judges that the business card images do not match each other. For example, a case will be described in which one business card image stored in the business card information storage unit 101 is judged to match the business card image subjected to the shape change processing shown in FIG. 7(*b*). In this case, business card information associated with the business card image judged to match the business card image subjected to the shape change processing is acquired (e.g., duplicated) from the business card information storage unit 101, and this business card information is stored in the business card information storage unit 101 as business card information corresponding to the business card image before the shape change processing. If one business card image stored in the business card information storage unit 101 is judged to match the business card image subjected to the shape change processing shown in FIG. 7(*b*), the same business card is already stored with respect to the same user. Accordingly, the business card image received by the business card image receiving unit 111 may be discarded without being accumulated, so that redundant information on the business card is prevented from being registered.

For example, it is assumed that there is no business card image matching the business card image received by the business card image receiving unit 111, among the business card images associated with the user ID "U001" managed by the business card image management information.

The business card image receiving unit 111 writes the business card image shown in FIG. 7(*b*) over the original business card image "U001NAME12.png", accumulates it in the business card information storage unit 101, and acquires a business card identifier of the business card image. The business card identifier is, for example, a value in which the user ID and a four-digit number indicating the order in which the business card image was accumulated are combined. For example, in this example, five business card images have been already accumulated as business card images associated with the user ID "U001", and, thus, the business card identifier is "U0010006". The business card image receiving unit 111 adds a record (row) having the business card identifier "U0010006", the user ID "U001", the file name "U001NAME12.png" of the business card image, and the current date "2012 Jan. 15", to the business card image management information.

Figure 9:
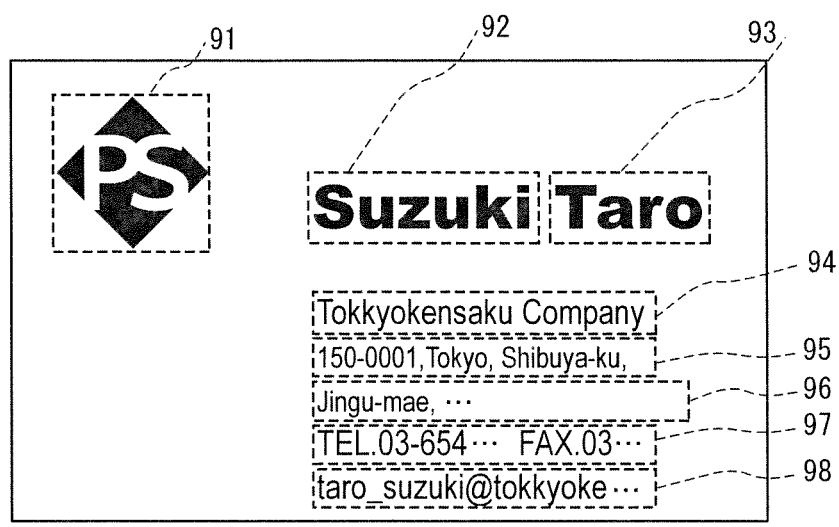
FIG. 9 is a view illustrating processing in which the business card management server generates pieces in the embodiment.
Figure 10A:
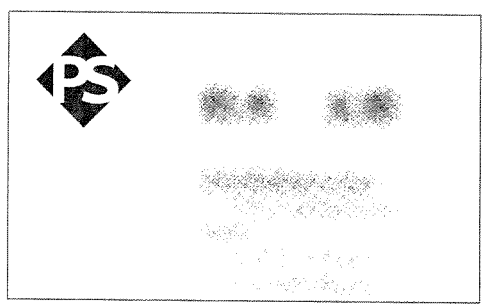
FIG. 10 shows views of exemplary pieces generated by the business card management server in the embodiment.
Figure 10B:
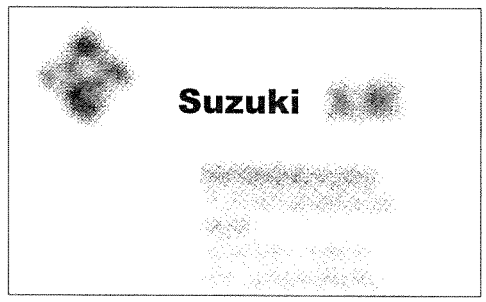
Figure 10C:
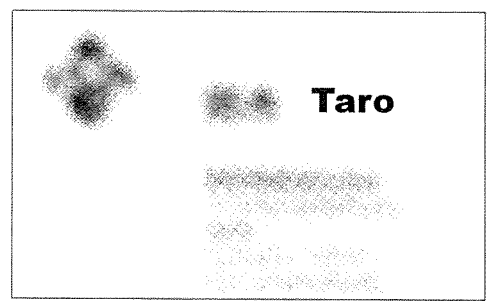
Figure 10D:
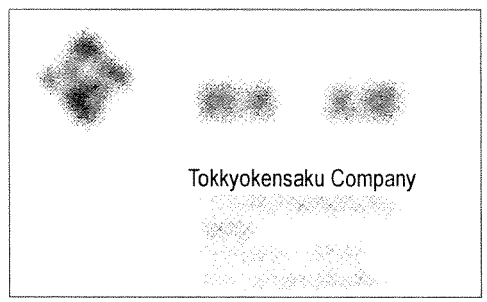
Figure 10E:
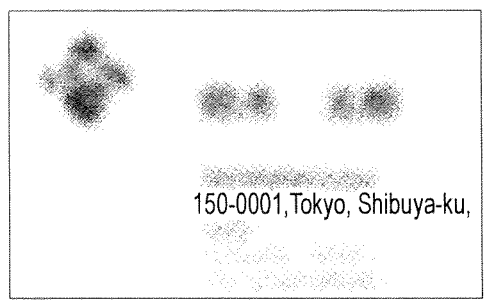
Figure 10F:
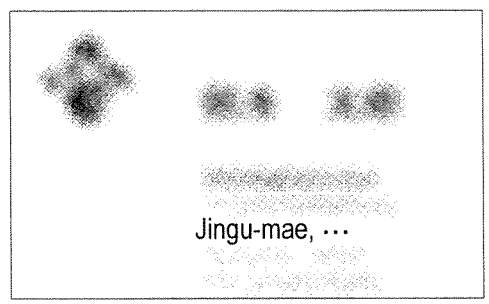
Figure 10G:
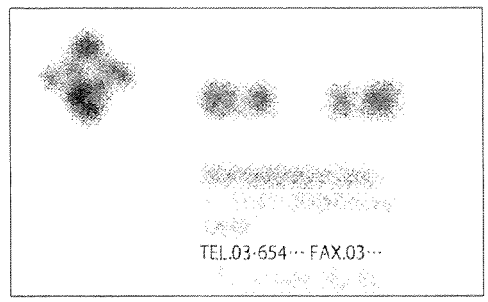
Figure 10H:
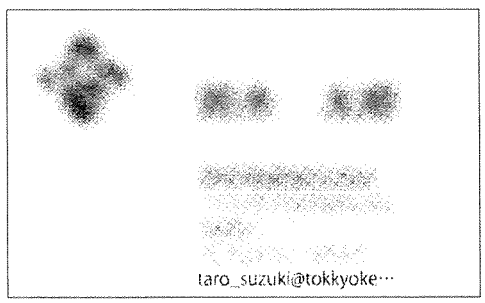

FIG. 9 is a view illustrating processing that generates pieces.

The piece generating unit 103 acquires two or more pieces from the business card image shown in FIG. 7(*b*). For example, the piece generating unit 103 sequentially detects multiple non-continuous rectangular regions each having pixels in a color other than the background color and surrounded by pixels in the background color, in the business card image shown in FIG. 7(*b*). For example, the piece generating unit 103 can detect such rectangular regions, by scanning the pixels in the vertical direction or the horizontal direction, and detecting rows and columns in which pixels in a color other than the background color appear. Since the background color of most business cards is white, for example, the background color is typically set to white. In this example, a region may be divided only in a case where there is a column in the background color having an at least predesignated number of pixels arranged in the horizontal direction such that a rectangular region in units of one character is not set. Accordingly, as shown in FIG. 9, multiple regions 91 to 98 not overlapping each other and surrounding information shown in the business card image can be detected. The information indicating the detected regions is temporarily stored in an unshown storage medium or the like.

Next, the piece generating unit 103 generates, for each of the detected regions 91 to 98, an image in which the portion other than each of the regions 91 to 98 is blurred, using the business card image shown in FIG. 7(*b*). These images respectively are pieces.

FIG. 10 shows views of exemplary pieces generated by the piece generating unit 103. FIGS. 10(*a*) to 10(*h*) are views showing eight pieces generated by blurring the portion other than each of the regions 91 to 98, in the business card image. The blurring level is set to a level at which a human cannot read characters.

The piece generating unit 103 accumulates the generated pieces in the piece storage unit 102 in association with the business card ID "0010006" acquired for this business card image. The accumulating may be considered as temporarily storing. For example, each piece is stored with a file name in which the original business card ID and a serial number are combined.

FIG. 11 shows piece management information for managing pieces stored in the piece storage unit 102. The piece management information has the attributes "business card ID" and "piece". In the table, "business card ID" is a business card identifier, and "piece" is a piece that is stored, and, in this example, indicates a file name of the piece.

The piece transmitting unit 104 transmits piece information containing each of the pieces associated with the business card ID "0010006", accumulated by the piece generating unit 103, to different input terminals 20. It is assumed that each set of piece information is transmitted to two different input terminals 20.

FIG. 12 is a table showing input terminal management information for managing the input terminals 20. It is assumed that the input terminal management information is, for example, stored in advance in an unshown storage unit. It is assumed that the input terminal management information is a list of input terminal identifiers. For example, the input terminal identifiers may be considered as address information, accounts, or the like of the input terminals 20, or may be associated with address information of the input terminals 20 stored in an unshown storage medium or the like.

The input terminal identifier may be considered as, for example, operator identifiers for identifying operators using the input terminals 20, specifically, accounts of the operators. In this case, for example, piece information transmitted by the piece transmitting unit 104 is temporarily stored in an unshown storage unit or the like in the business card management server 10 in association with an input terminal identifier. Then, if an operator inputs his or her operator identifier and accesses the business card management server 10, the piece information transmitted by the piece transmitting unit 104 for this operator identifier may be transmitted from the business card management server 10 to the input terminal 20 used by the operator. The case in which information is eventually transmitted to the input terminal 20 in this manner also may be considered as transmission. Information such as an account or a user ID with which a transmission destination can be specified in this case, or information associated with this information may be the input terminal identifier. Information with which the input terminal 20 can be indirectly specified may be the input terminal identifier.

FIG. 13 shows terminal business card management information for managing business card identifiers corresponding to pieces previously transmitted to the input terminals 20. The terminal business card management information has the attributes "input terminal identifier" and "business card identifier". In the table, "input terminal identifier" is an input terminal identifier. Since pieces can be transmitted to the privileged input terminals 30 as well as the input terminals 20 in this example, it is assumed that the input terminal identifiers include privileged input terminal identifiers for identifying the privileged input terminals 30. Furthermore, "business card identifier" is a business card identifier associated with a piece transmitted to the input terminal 20 indicated by the input terminal identifier.

The piece transmitting unit 104 first performs processing for transmitting a first piece among the pieces generated by the piece generating unit 103. First, one input terminal identifier is acquired from the input terminal management information in FIG. 12. There is no limitation on the procedure in which this input terminal identifier is acquired. For example, the input terminal identifiers are acquired in the arrangement order of the input terminal identifiers managed by the input terminal management information. In this example, an input terminal identifier arranged directly after an input terminal identifier in the previous transmission is acquired. For example, if the input terminal identifier acquired when a piece was transmitted at the end in the previous transmission is "OP0001", "OP0002" is first acquired.

Next, the piece transmitting unit 104 searches for a record with the attribute value of "input terminal identifier" matching "OP0002", and "business card ID" matching "0010006", which is a business card ID corresponding to a first piece of the pieces that are to be transmitted by the piece transmitting unit 104, in the terminal business card management information shown in FIG. 13. In this example, it is assumed that such a matching record is not detected. This fact indicates that no piece acquired from the business card image corresponding to the business card ID "0010006" is transmitted to the input terminal 20 with the input terminal identifier being "OP0002". Accordingly, the piece transmitting unit 104 transmits piece information having the first piece (specifically, the piece with the file name being "00100061.png") and the business card identifier "0010006", to the input terminal 20 with the input terminal identifier being "OP0002". Note that, if a matching record is detected, the piece transmitting unit 104 does not transmit the piece information to the input terminal 20 with the input terminal identifier being "OP0002", and acquires the next input terminal identifier and repeats similar processing. Accordingly, pieces acquired from the same business card image are transmitted to different input terminals 20.

Furthermore, in this example, it is assumed in advance that one piece is transmitted to two different input terminals 20, and, thus, the piece transmitting unit 104 acquires the next input terminal identifier "OP0003" and performs processing for transmitting the first piece information as described above. It is assumed that the piece transmitting unit 104 transmits the first piece information as described above to the input terminal 20 corresponding to the input terminal identifier "OP0003". That is to say, the piece transmitting unit 104 has transmitted piece information having the first piece to two input terminals.

The piece transmitting unit 104 further repeats similar processing for transmitting the second and subsequent pieces. Then, multiple sets (two sets, in this example) of all pieces acquired with respect to the business card ID "0010006" are transmitted respectively to different multiple input terminals 20, and the transmission processing is ended. That is to say, only one piece acquired with respect to the business card ID "0010006" is transmitted to one input terminal 20.

Next, as exemplary processing of one input terminal 20 functioning as a transmission destination of the piece information, a case will be described in which the transmission destination is the input terminal 20 with the input terminal identifier being "OP0004". Note that the input terminal 20 in this example may be the privileged input terminal 30.

The piece receiving unit 202 of the input terminal 20 with the input terminal identifier being "OP0004" receives piece information transmitted from the business card management server 10. The piece information that is received is piece information having the piece with the piece identifier being "00100062.png" and the business card identifier "0010006".

The piece output unit 203 outputs the piece contained in the piece information received by the piece receiving unit 202. The output is, for example, displaying on a monitor.

Figure 14:
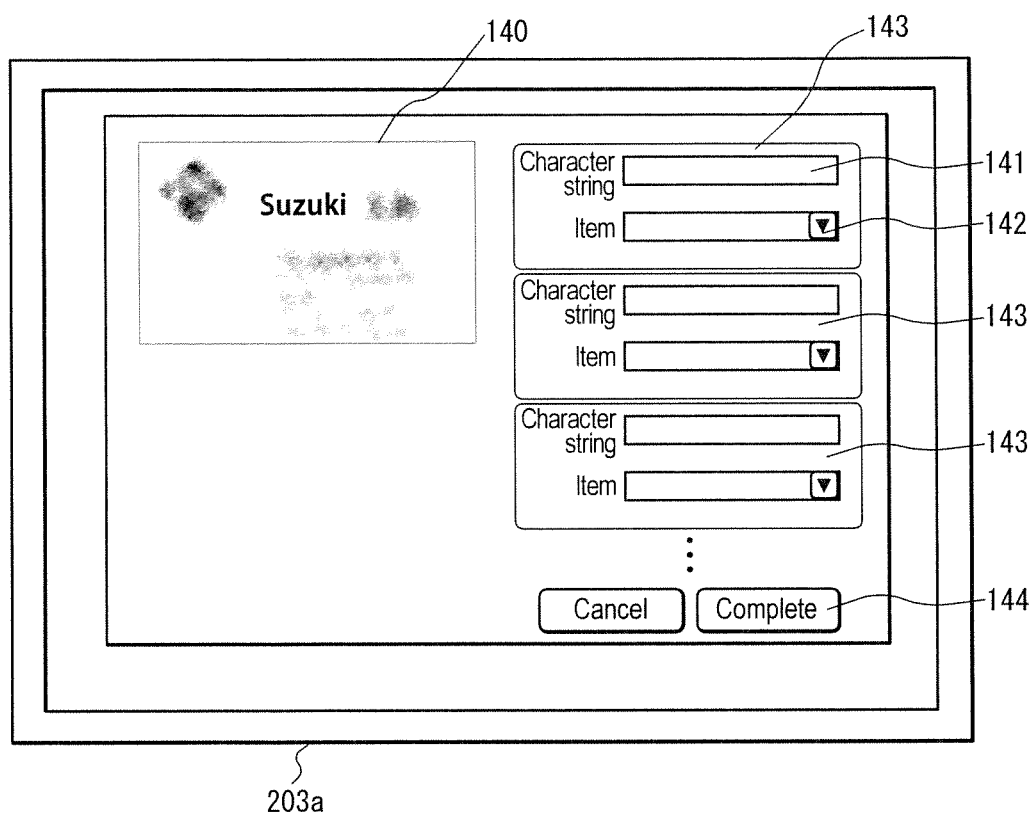
FIG. 14 is a view showing a display example of a piece of the business card management server in the embodiment.

FIG. 14 is a view showing a display example of a piece by the piece output unit 203. The output is, for example, displaying on a monitor 203a. In this example, the piece output unit 203 displays a piece in a display region 140 for piece display. Furthermore, it is assumed that the piece output unit 203 displays, as an example, multiple input field pairs 143 each having a character string input field 141 for accepting a business card partial character string with respect to the displayed piece and an item input field 142 for accepting item information, and a complete button 144 for inputting completion of the input.

The operator of the input terminal 20 with the input terminal identifier being "OP0004" sees a piece displayed in the display region 140, and inputs a recognizable character string, that is, a character string in the image of a portion without blurring shown in the piece, to the character string input field 141, by operating an unshown keyboard or the like. The accepting unit 201 accepts the character string input to the character string input field 141, as a business card partial character string corresponding to the piece. In this example, it is assumed that the operator has input a character string "Suzuki", to the character string input field 141 of one of the input field pairs 143.

Furthermore, if the operator inputs item information of the input text to the item input field 142, the accepting unit 201 accepts the input item information. For example, it is assumed that a master table or the like having multiple item information applicable to business card partial character strings is stored in advance in an unshown storage medium or the like. In response to the operation of the operator, the piece output unit 203 outputs a pulldown list having the item information of the master table as items of this list, near the item input field 142. The item information selected by the operator using a mouse or the like from the pulldown list is input to the item input field 142. For example, in this example, it is assumed that item information consisting of "family name", "given name", "zip code", "address 1 (city and state/province)", "address 2 (building name, street number, and street name)", "telephone number", "facsimile number", "mobile number", and "mail address" is stored in the master table. In this example, if the operator selects the item information "family name" from the pulldown list displayed for the item input field 142 of the one input field pair having the character string input field 141 to which the above-described character string was input, the item information "family name" is input to the item input field 142.

If multiple character strings that seem to belong to different items are read from one piece, pairs of a character string belonging to each item and item information thereof are input to the character string input field 141 and the item input field 142 of different input field pairs 143. For example, it is assumed that a character string "TEL: 03-55xx-xxx1 FAX: 03-55xx-xxx2" is read from one piece. In this case, the operator may input "03-55xx-xxx1" to the character string input field 141 of a first input field pair 143 and "telephone number" to the item input field 142 thereof, and further input "03-55xx-xxx2" to the character string input field 141 of a second input field pair 143 and "facsimile number" to the item input field 142 thereof.

Furthermore, if information read from one piece is information that cannot be converted into a character string, such as a logo mark, or if the information is a character string indicating an item not contained in the master table of the item information, for example, the operator may delete the piece information, for example, without inputting a business card partial character string or the like with respect to this piece. Alternatively, the operator inputs a predesignated character string (e.g., a character string "others", "logo", etc.) as a business card partial character string, and further inputs predesignated item information (e.g., "others", "logo", etc.). The business card management server 10 that has received the partial business card information containing a business card partial character string and the item information may delete the information contained in the partial business card information, for example. Note that the piece generating unit 103 may not generate any piece from information that cannot be converted into characters in advance by OCR processing or the like.

The piece generating unit 103 may not generate any piece from a portion in which information cannot be converted into a character string, such as a logo mark. For example, no piece may be generated from a portion that cannot be recognized in OCR processing or the like, or in which the recognition rate is a threshold or less. Furthermore, no piece may be generated from a portion in which the size of a minimum rectangle surrounding an image or the like is a threshold or more.

If the operator clicks on the complete button 144 using a mouse or the like, the accepting unit 201 judges whether or not a business card partial character string has been accepted. In this example, the character string "Suzuki" has been accepted, and, thus, it is judged that a business card partial character string has been accepted. The accepting unit 201 judges whether or not item information has been accepted with respect to each accepted business card partial character string. In this example, the item information "family name" has been accepted as item information corresponding to the character string "Suzuki", and, thus, it is judged that item information has been accepted.

As described above, in this example, the accepting unit 201 has accepted a business card partial character string and item information corresponding to this business card partial character string. Accordingly, the partial business card information transmitting unit 204 transmits partial business card information having a pair of the partial business card character string "Suzuki" and the item information "family name" corresponding to this partial business card character string accepted by the accepting unit 201, and the business card identifier "0010006" contained in the piece information, to the business card management server 10. If the accepting unit 201 has not accepted at least one of the partial business card information and the item information, information is not transmitted to the business card management server 10, and, for example, the piece output unit 203 displays a message or the like for prompting input of such information, on the monitor 203a or the like. If the accepting unit 201 has accepted multiple pairs of the business card partial character string and the item information, the partial business card information transmitting unit 204 may transmit, for each pair of the business card partial character string and the item information, partial business card information having the business card identifier, to the business card management server 10. The partial business card information transmitting unit 204 may transmit partial business card information further having the input terminal identifier of that terminal, stored in advance in an unshown storage unit or the like.

The other input terminals 20 that have received piece information also perform similar processing.

The partial business card information receiving unit 105 of the business card management server 10 receives the partial business card information, from the input terminal 20 with the input terminal identifier being "OP0004". The partial business card information receiving unit 105 judges whether or not at least a predesignated number of partial business card information each having a pair of a business card identifier and item information matching the pair of the business card identifier "0010006" and the item information "family name" contained in the received partial business card information are stored in an unshown storage unit in which received partial business card information is to be stored. The predesignated number is a number obtained by subtracting 1 from the number of transmissions of the same piece information (2, in this example), and, in this example, the predesignated number is 1. In this specific example, the same piece information is transmitted to multiple (two, in this example) different input terminals 20, and, thus, if the item information that is input at the input terminal 20 with respect to this piece is correct, partial business card information having a pair of the same business card identifier and the same item information may be stored. If partial business card information having a pair of the same business card identifier and the same item information is not stored, the received partial business card information is accumulated in this unshown storage unit.

For example, it is assumed that partial business card information having a pair of the same business card identifier and the same item information is already stored. The determination judging unit 107 reads the determination condition stored in the determination condition storage unit 106. Then, the business card partial character string contained in the partial business card information having the pair of the same business card identifier and the same item information is read from the unshown storage unit, and it is judged whether or not the read determination condition is satisfied by this business card partial character string and the business card partial character string contained in the received partial business card information. It is assumed that the read determination condition is a condition indicating a full match. If the business card partial character string read from the partial business card information stored in the unshown storage unit is "Suzuki", this business card partial character string and the business card partial character string read from the received partial business card information, which is "Suzuki", fully match each other, and, thus, the determination judging unit 107 judges that the determination condition is matched. Accordingly, the business card partial character string accumulating unit 110 accumulates the matching business card partial character string "Suzuki", the received item information "family name", and the business card identifier "0010006" in association with one another in the business card information storage unit 101.

FIG. 15 is a table showing business card information management information for managing business card partial character strings, item information, and business card identifiers accumulated in the business card information storage unit 101. The business card information management information has items "business card ID", "item", and "character string". In the table, "business card ID" is a business card identifier, "item" is item information, and "character string" is a business card partial character strings.

In this manner, the business card partial character string corresponding to the piece of the business card image is accumulated in the business card information storage unit 101. Accordingly, information on characters shown in the business card image can be converted into character strings, that is, text data and accumulated.

If the partial business card information receiving unit 105 has received multiple partial business card information from one input terminal 20, the determination judging unit 107 performs similar processing for each set of partial business card information.

For example, a case will be described in which the determination judging unit 107 judges that the business card partial character strings compared with each other do not match the determination condition, that is, the business card partial character strings compared with each other do not fully match each other. For example, it is assumed that the business card partial character strings compared with each other are "Suzuki" and "Suzumoto". If they do not match each other, the business card image transmitting unit 109 acquires a pair of the item information "family name" and the business card identifier "0010006" contained in the partial business card information received by the partial business card information receiving unit 105, and further reads the business card image "U001NAME12.png" corresponding to this business card identifier "0010006" from the business card information storage unit 101. Note that all of partial business card information that are judged not to match each other may be deleted.

The business card image transmitting unit 109 transmits input prompting information having the read business card image "U001NAME12.png", and the pair of the item information "family name" and the business card identifier "0010006", in association with each other, to one privileged input terminal 30. The business card image contained in the input prompting information is an image in which all information shown on the business card is recognizable. For example, the business card image is a business card image in a state of being stored in the business card information storage unit 101. The input prompting information may further have information such as a comment or an instruction for asking the privileged operator to perform input.

FIG. 16 is a table showing privilege identifier management information for managing privilege identifiers stored in the privilege identifier storage unit 108. The privilege identifier management information is a list of privilege identifiers of the privileged input terminals 30. The privilege identifiers are input terminal identifiers corresponding to the privileged input terminals 30, among the input terminal identifiers shown in FIG. 12.

The business card image transmitting unit 109 reads one privilege identifier from among the privilege identifiers managed by the privilege identifier management information shown in FIG. 16, and transmits the business card image and the pair of the item information and the business card identifier to the privileged input terminal 30 indicated by the read privilege identifier. There is no limitation on the procedure in which the business card image transmitting unit 109 reads one privilege identifier. For example, a privilege identifier may be selected at random, or a privilege identifier selected in the previous transmission may be provided with information such as a flag, so that a privilege identifier whose privilege identifier value is sorted to be arranged next the privilege identifier selected in the previous transmission may be selected. The sorting may be any sorting, and examples thereof include sorting in ascending order or descending order of privilege identifier values. In this example, it is assumed that the business card image transmitting unit 109 selects "OP1001" as one privilege identifier, and transmits the business card image and the pair of the item information and the business card identifier to the privileged input terminal with this privilege identifier.

The input prompting information receiving unit 206 of the privileged input terminal 30 with the privilege identifier being "OP1001" receives the input prompting information having the business card image "U001NAME12.png", and the pair of the item information "family name" and the business card identifier "0010006", from the business card management server 10.

The input prompting information output unit 207 in this example displays the received input prompting information on a monitor or the like. In this example, the received item information is also output. Furthermore, the character string input field 141 for a business card partial character string and the like are also displayed as in the piece output unit 203 shown in FIG. 14.

Figure 17:
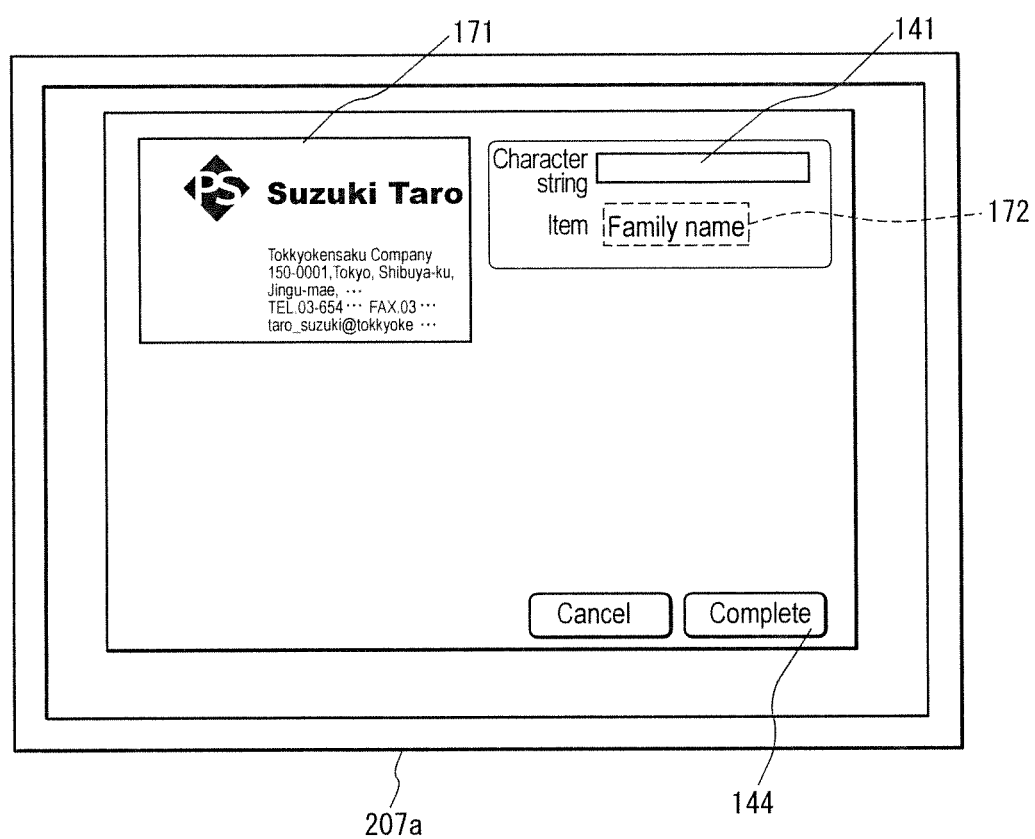
FIG. 17 is a view showing a display example of input prompting information of the privileged input terminal in the embodiment.

FIG. 17 is a view showing a display example of input prompting information by the input prompting information output unit 207.

It is assumed that the privileged operator using the privileged input terminal 30 with the privilege identifier being "OP1001" sees a business card image 171, which is input prompting information, and item information 172 that are displayed on a monitor 207a, searches for a portion in which "family name" is displayed in the business card image, and inputs the character string "Suzuki" to the character string input field 141. Then, the privileged operator clicks on the complete button 144.

The privileged partial business card information transmitting unit 208 transmits privileged partial business card information that is partial business card information having the pair of the item information "family name" and the business card identifier "0010006" received by the input prompting information receiving unit 206, and the business card partial character string accepted by the privileged accepting unit 205, to the business card management server 10. The privileged partial business card information may further have the privileged terminal identifier of that terminal.

The partial business card information receiving unit 105 of the business card management server 10 receives the privileged partial business card information from the privileged input terminal 30. The business card partial character string accumulating unit 110 accumulates the business card partial character string, the item information, and the business card identifier contained in the privileged partial business card information received by the partial business card information receiving unit 105, in association with each other in the business card information storage unit 101. In this manner, the business card partial character string input by the privileged operator is accumulated as a reliable business card partial character string, without being subjected to the above-described judgment processing for determination.

The business card image transmitting unit 109 detects a record with "date" being a predesignated number of days (e.g., 7 days) before the current date, from among the records in the business card image management information shown in FIG. 8, and acquires a value of "business card identifier" of the detected record. For example, if the current date is "2012 Feb. 26", a record at the date "2012 Feb. 19" is searched for. In this example, it is assumed that two records are detected, and "0020003" and "0230018", which are the values of "business card ID" of the records, are acquired. The detected records may be provided with unshown flag information or the like such that the records are not detected again.

The business card image transmitting unit 109 searches for a record with "business card ID" matching "0020003", which is one of the acquired values of "business card ID", in the business card partial character string management information shown in FIG. 15. The business card image transmitting unit 109 acquires a value of "item" of the detected record. It is assumed that "family name", "given name", "address 1", "address 2", "mail address", and "telephone number" are acquired. Then, item information not matching any value of "item" of the detected records is detected from among predesignated one or at least two item information. If the predesignated item information is "family name", "given name", "company name", "address 1", "address 2", "telephone number", "facsimile number", and "mail address", the business card image transmitting unit 109 detects "company name" and "facsimile number" as the item information not matching any value. The business card image transmitting unit 109 transmits the detected item information, the business card identifier "0020003", and the input prompting information having the business card image corresponding to this business card identifying information, as described above, to one privileged input terminal 30.

The business card image transmitting unit 109 performs similar processing also for "0230018", which is the above-detected "business card ID" other than "0020003".

In the privileged input terminal 30, as described above, if the input prompting information receiving unit 206 receives the input prompting information, the item information, and the business card identifier, the input prompting information output unit 207 displays the input prompting information and each set of item information. Then, the business card partial character string input by the privileged operator with respect to each set of displayed item information is accepted by the privileged accepting unit 205. The partial business card information transmitting unit 204 transmits privileged partial business card information each having the pair of the business card partial character string accepted for each set of item information and the item information, and the business card identifier, to the business card management server 10.

The processing by the business card management server 10 that has accepted this privileged partial business card information is as described above, and, thus, a description thereof has been omitted.

Accordingly, business card partial character strings with respect to items such as essential items that have not been input when a predetermined period of time has passed can be compensated for by a privileged operator.

As described above, according to this embodiment, the business card management server transmits multiple pieces acquired from one business card image respectively to different multiple input terminals 20, and causes the operators of the input terminals 20 to input business card partial character strings corresponding to the respective piece. Accordingly, one operator is prevented from recognizing the whole of one business card image, so that the privacy of information on the business card can be ensured.

In the foregoing embodiment, when the piece generating unit 103 generates pieces, character strings indicating characters shown in regions that are recognizable in the pieces may be acquired using OCR processing or the like, and the piece transmitting unit 104 may transmit piece information further containing the character strings to the input terminals 20. Then, each input terminal 20 may accept the character string acquired from this piece, as a tentative business card partial character string corresponding to the piece, and may be allowed to correct this tentative business card partial character string according to input at the accepting unit. Alternatively, the input terminal 20 may display the character string acquired from this piece, as an exemplary business card partial character string corresponding to the piece. Accordingly, input by the operator can be assisted.

Furthermore, the business card management server 10 may transmit partial business card information containing the business card partial character string input with respect to one piece by one operator using an input terminal 20, together with the piece, to an input terminal 20 of another operator, and causes the other operator to check and correct the business card partial character string contained in the partial business card information. The input terminal 20 of the other operator outputs the piece received by the piece receiving unit 202 and the business card partial character string of the partial business card information, and prompts the other operator to check the business card partial character string or to input correction thereof. If the accepting unit 201 of the input terminal 20 accepts information indicating the check or correction of the business card partial character string from the other operator, the partial business card information transmitting unit 204 transmits the information indicating the check and the received partial business card information, or the corrected partial business card information and information indicating completion of the correction, to the business card management server 10.

If the partial business card information receiving unit 105 receives the partial business card information, and the information indicating the check or the information indicating completion of the correction, the business card partial character string accumulating unit 110 may accumulate this partial business card information as described above. Accordingly, multiple operators can check the business card partial character string input with respect to one piece. The check may be considered as so-called verification or the like. Note that transmission of the partial business card information from the other input terminal 20 may be considered as also meaning transmission of the information indicating the check or the information indicating completion of the correction.

In the foregoing embodiment, for example, the determination judging unit 107 determines partial business card information according to whether or not there are matches with a business card partial character string and item information of the partial business card information. However, in the present invention, whether or not there is a match with a business card partial character string contained in the partial business card information and whether or not there is a match with item information may be individually judged. If it is judged that there is a match only with either a business card partial character string or item information, only that matching information may be determined and the remaining undetermined portion of the partial business card information may be input by a next operator such as a privileged operator. For example, if there is a match with item information but not with a business card partial character string, the business card partial character string may be input by the next operator. The same is applied to embodiments below.

In this embodiment, a case in which the business card management system 1 includes multiple input terminals 20 and the piece transmitting unit 104 transmits two or more piece information corresponding to one business card image respectively to different input terminals 20 was described as an example. However, in the present invention, the number of input terminals may be one or more, and the piece transmitting unit 104 may transmit two or more piece information corresponding to one business card image respectively to the one or more input terminals 20. Since each piece is an image in which only part of a business card image is recognizable, even if multiple pieces generated from the same business card image are compared by sight or the like, it is difficult to judge whether or not the compared pieces are pieces generated from the same business card image. Accordingly, even if piece information respectively having multiple pieces generated from the same business card image are transmitted to the input terminal 20 used by one operator, the operator cannot judge whether or not the pieces contained in the piece information for which the business card partial character strings are to be input are pieces corresponding to the same business card image. Accordingly, the operator cannot collect information written on one business card, from multiple pieces corresponding to one business card image, so that the privacy of information on the business card can be protected. In this case, it is preferable that, specifically, the piece output unit 203 of the input terminal 20 cannot output the business card identifier contained in the piece information in a manner, recognizable to the operator, preferably, cannot output the business card identifier. The reason for this is that, if the business card identifier is recognizable to the operator, the operator may possibly collect information on one business card by collecting information on different pieces output together with the same business card identifier.

The same is applied to a case in which the piece transmitting unit 104 transmits three or more piece information corresponding to one business card image to different input terminals 20 and two or more piece information corresponding to the one business card image can be transmitted to one input terminal 20.

The same is applied to embodiments below.

Embodiment 2

A business card management system 1a of this embodiment is similar to the above-described business card management system 1, except that a different business card management server is provided for each language of characters shown on a business card so that information on business cards can be managed for each language of characters.

Figure 18:
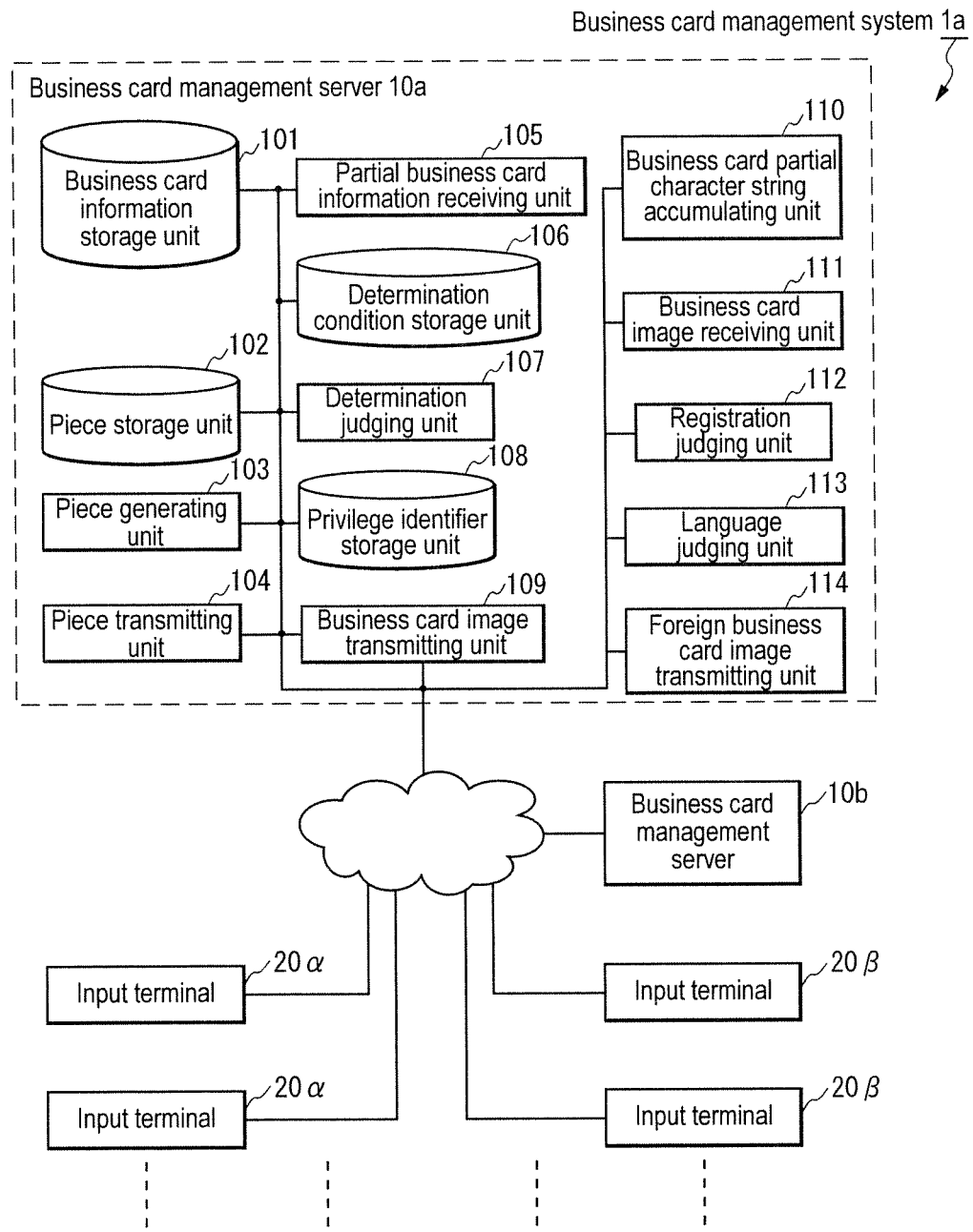
FIG. 18 is a block diagram of a business card management system in Embodiment 2 of the present invention.

FIG. 18 is a block diagram showing the configuration of the business card management system 1a according to this embodiment. In FIG. 18, the same reference numerals as in FIG. 2 denote the same or corresponding constituent elements, and a detailed description thereof has been omitted. The business card management system 1a has a business card management server 10a and one or at least two business card management servers 10b. Hereinafter, a case in which the number of business card management servers 10b is one will be described as an example. It is assumed that part of the two or more input terminals 20 forming the business card management system accepts the piece information or the input prompting information transmitted by the business card management server 10b. In this example, the input terminals 20 are configured by one or at least two input terminals 20α and one or at least two input terminals 20β, wherein the input terminals 20β are input terminals 20 that accept the piece information and the like transmitted by the business card management server 10b. The input terminals 20α may receive only the piece information transmitted by the business card management server 10a, or may receive also the piece information transmitted by the business card management server 10b. The input terminals 20α and the input terminals 20β have a configuration similar to that of the input terminals 20 described above, except that servers from which the received piece information and the like were transmitted are different.

In this example, the privileged input terminals 30 are not shown, but one or more of the input terminals 20 may be privileged input terminals.

The business card management server 10a is similar to the above-described business card management server 10, except that a language judging unit 113 and a foreign business card image transmitting unit 114 are further included.

The business card management server 10b has a configuration similar to that of the business card management server 10. The business card management server 10b is, for example, a business card management server that manages business cards written in a language different from that in the business card management server 10a. In this example, the business card management server 10*b* is referred to as a foreign business card management server.

The language judging unit 113 judges a language in one business card image. For example, the language judging unit 113 performs OCR processing or the like on a business card image, thereby converting character images shown on the business card into a character string, and uses this character string to judge a language in the business card image. For example, if at least a predesignated number of characters in the character string acquired by converting the business card image are alphabet letters, the language judging unit 113 may judge that the language is English. If at least a predesignated number of characters are in Japanese, it may be judged that the language is Japanese. The processing that judges a language from character strings (text information) acquired from business card images is a known technique, and, thus, a detailed description thereof has been omitted.

Examples of the language judgment processing include processing as described in Non-Patent Document 1 below. "Non-Patent Document 1: "ProjectHomeJa-language-detection-Language Detection Library for Java (registered trademark) Project Home (in Japanese)-Language Detection Library for Java (registered trademark)-Google Project Hosting", [online], [accessed on Dec. 27, 2012], the Internet <URL: http://code.google.com/p/language-detection/wiki/ProjectHomeJa>".

For example, the language judging unit 113 judges a language in a business card image stored in the business card information storage unit 101. For example, the language judging unit 113 may judge a language in a business card image received by the business card image receiving unit 111.

The language judging unit 113 may be realized typically by an MPU, a memory, or the like. Typically, the processing procedure of the language judging unit 113 is realized by software, and the software is stored in a storage medium such as a ROM. Note that the processing procedure may be realized also by hardware (a dedicated circuit).

The foreign business card image transmitting unit 114 transmits a business card image to the foreign business card management server 10*b*, which is one business card management server different from the business card management server 10*a*, according to the language judged by the language judging unit 113. For example, the foreign business card image transmitting unit 114 transmits a business card image whose language has been judged, to one foreign business card management server 10*b* associated with the judged language. Specifically, the foreign business card image transmitting unit 114 transmits business card information having the business card image. The transmitting to the foreign business card management server 10*b* according to the language judged by the language judging unit 113 is a concept that includes not transmitting to the foreign business card management server 10*b* according to the judged language.

For example, if the judged language is a predesignated language, the foreign business card image transmitting unit 114 does not transmit a business card image in this language to the foreign business card management server 10*b*, and, if not, the foreign business card image transmitting unit 114 transmits the business card image to the foreign business card management server 10*b*.

Note that one business card image may be transmitted to a foreign business card management server as follows. For example, management information for associating one or at least two languages with server identifiers of one or at least two foreign business card management servers in one-to-one or many-to-one association is stored in advance in an unshown storage unit or the like. The foreign business card image transmitting unit 114 may acquire a server identifier corresponding to the language of one business card image judged by the language judging unit 113, from this management information, and transmit the one business card image to the foreign business card management server indicated by the server identifier. In this case, for example, if the language acquired by the language judging unit 113 is a language not included in this management information, this business card image is not transmitted to another business card management server. The server identifier is an identifier of a business card management server, and may be, for example, address information such as an IP address, a MAC address, a mail address, or the like of the business card management server, or may be code, an account, or the like associated therewith.

If the foreign business card image transmitting unit 114 transmits a business card image to the other foreign business card management server 10*b*, for example, the foreign business card image transmitting unit 114 may delete this business card image from the business card information storage unit. For example, if the business card image received by the business card image receiving unit 111 is transmitted to the other foreign business card management server 10*b*, the business card image receiving unit 111 may not accumulate the received business card image in the business card information storage unit 101, and the piece generating unit 103 may not generate any piece from the business card image.

The foreign business card image transmitting unit 114 is realized typically by a wireless or wired communication part, but may be realized also by a broadcasting part. The foreign business card image transmitting unit 114 may be considered to include or not to include a communication device. The foreign business card image transmitting unit 114 may have an MPU, a memory, or the like for performing judgment processing and the like. Typically, the procedure and the like of the judgment processing are realized by software, and the software is stored in a storage medium such as a ROM. Note that the procedure may be realized also by hardware (a dedicated circuit).

The business card image receiving unit 111 of the foreign business card management server 10*b* receives a business card image transmitted by the business card management server 10*a*.

The configuration of the input terminals 20*a* is similar to that of the input terminals 20, and, thus, a description thereof has been omitted.

The piece receiving unit 202 of each of the input terminals 20β receives the piece information transmitted from the foreign business card management server 10*b*, which is a business card management server different from the business card management server 10*a*, which is one business card management server.

The partial business card information transmitting unit 204 of the input terminal 20β transmits partial business card information having the business card partial character string accepted by the accepting unit 201 and the business card identifier received by the piece receiving unit 202, to the foreign business card management server 10*b*, which is a business card management server different from the one business card management server 10*a*.

If the input terminal 20β is a privileged input terminal, the privileged input terminal may accept input prompting information and the like transmitted by the business card management server 10*b*.

Figure 19:
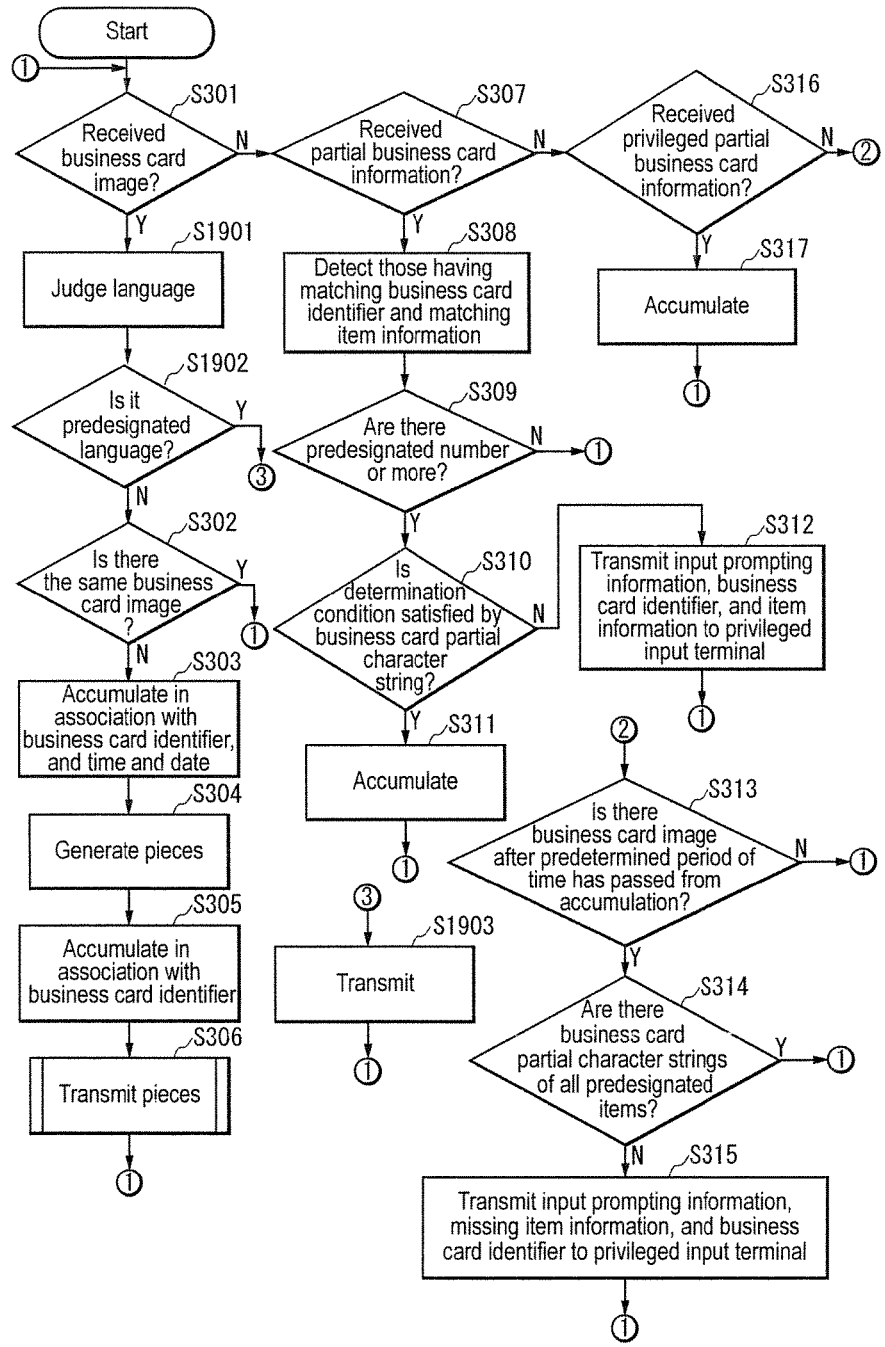
FIG. 19 is a flowchart illustrating an operation of the business card management server in the embodiment.

FIG. 19 is a flowchart illustrating an operation of the business card management server 10a according to this embodiment. In the flowchart, the same reference numerals as in FIG. 3 denote the same or corresponding steps, and, thus, in this example, a detailed description thereof has been omitted.

(Step S1901) The language judging unit 113 judges a language in a business card image.

(Step S1902) The foreign business card image transmitting unit 114 judges whether or not the language judged in step 1901 is a predesignated language. If it is a predesignated language, the procedure advances to step S1903, and, if not, the procedure advances to step S302.

(Step S1903) The foreign business card image transmitting unit 114 transmits the business card image to the foreign business card management server 10b. The procedure returns to step S301.

Note that the procedure is terminated by powering off or an interruption at completion of the process in the flowchart in FIG. 19.

The processing by the foreign business card management server 10b is similar to that in the flowchart in FIG. 3, except that the business card image receiving unit 111 receives a business card image transmitted from the business card management server 10a.

With the business card management system 1a according to this embodiment as described above, if the language in a business card image is a predesignated language (or is not a predesignated language), the business card image is transmitted to the foreign business card management server 10b. Accordingly, the business card image is stored in the foreign business card management server 10b, and pieces generated from the business card image are transmitted to the input terminals 20β, which are part of the input terminals 20 corresponding to the foreign business card management server 10b, and business card partial character strings are input. Accordingly, if operators or the like familiar with reading and the like of the predesignated language are allocated as operators using the input terminals 20β, the business card partial character strings can be efficiently and accurately input.

In this embodiment, the business card management server 10a judges whether or not to transmit a business card image to the foreign business card management server 10b or the like according to the language. However, in the present invention, a business card information processing server (not shown) may be provided in order to transmit a business card image selectively to a business card management server according to the language of information written on the business card. That is to say, this business card information processing server may be considered as a server for controlling the business card management servers 10 that manage business card images.

The business card information processing server (not shown) is a server, for example, including the business card information storage unit 101, the language judging unit 113, and the foreign business card image transmitting unit 114. The business card information processing server (not shown) may further include the business card image receiving unit 111. This business card information processing server and multiple business card management servers may be considered to form a business card management system. Alternatively, this business card information processing server, multiple business card management servers, and multiple input terminals may be considered to form a business card management system.

In this case, for example, each of the multiple business card management servers 10 may receive a business card image transmitted from the business card information processing server, and accumulate the received business card image in the business card information storage unit 101.

Embodiment 3

In this embodiment, a business card image acquiring apparatus will be described that can delete the background portion other than a business card from a business card image transmitted by a user or the like, and provide the obtained image to the business card management server described in the foregoing embodiments.

Figure 20:
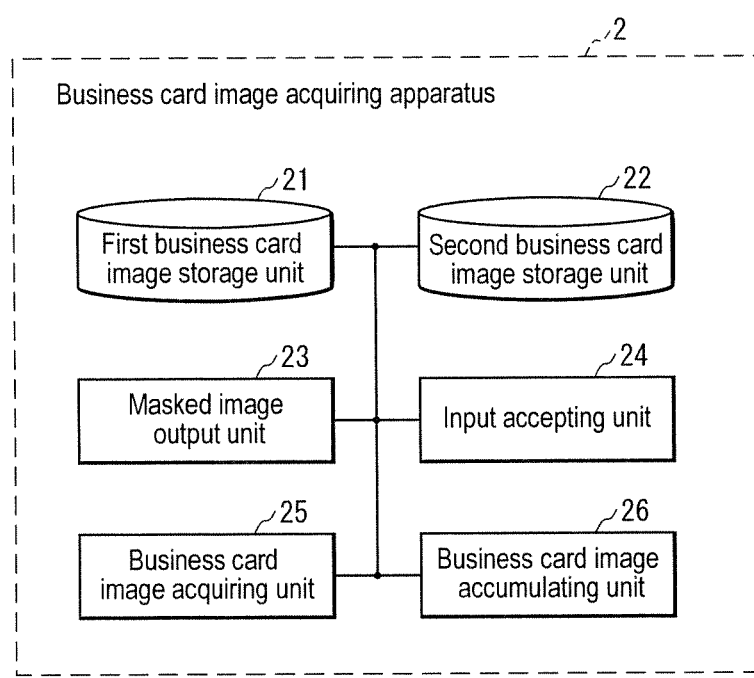
FIG. 20 is a block diagram of a business card image acquiring apparatus in Embodiment 3 of the present invention.

FIG. 20 is a block diagram of a business card image acquiring apparatus 2 in Embodiment 3.

The business card image acquiring apparatus 2 includes a first business card image storage unit 21, a second business card image storage unit 22, a masked image output unit 23, an input accepting unit 24, a business card image acquiring unit 25, and a business card image accumulating unit 26.

In the first business card image storage unit 21, one or more business card images are stored. A business card image stored in the first business card image storage unit 21 is, for example, an image including an image of a business card and an image of the background of the business card. For example, the business card image stored in the first business card image storage unit 21 is an image of a business card captured by a digital camera or the like, or an image of a business card scanned by a general-purpose scanner other than scanners dedicated to business cards. In the first business card image storage unit 21, for example, a business card image transmitted from a user and received by an unshown receiving unit or the like is stored.

In the second business card image storage unit 22, one or more business card images acquired by the business card image acquiring unit 25 are stored. A business card image stored in the second business card image storage unit 22 is a business card image acquired by the business card image acquiring unit 25 and accumulated by the business card image accumulating unit 26. For example, the business card image stored therein is a business card image cut out according to a cutout instruction, which will be described later.

The masked image output unit 23 constructs and outputs a masked image in which characters that appear in the business card image stored in the first business card image storage unit 21 are masked. In this example, the masked image output by the masked image output unit 23 is referred to as a business card masked image. The business card masked image is an image similar to a masked image in a piece described in the foregoing embodiments. Note that, in the case of a piece, the region other than part of a business card image is masked such that only this part is recognizable, but the masked image constructed in this embodiment is a masked image obtained by masking all characters that appear in a business card image.

It is preferable that the masked image constructed in this embodiment is an image in which masking is performed such that a boundary between the portion showing a business card and the portion showing a background other than the business card can be identified from each other in a business card image. For example, the masked image output unit 23 automatically detects a region in which a business card is displayed in a business card image, using the background color of the business card (e.g., the color corresponding to the card face portion) or the like. Then, a rectangular region or the like surrounding a region having pixels other than pixels in the background color in the region in which the business card is displayed are automatically detected. The detected rectangular region is filled in with a predesignated color, pattern, or the like, deleted, blurred, or subjected to mosaic processing, so that the region showing characters is masked, and a business card masked image is constructed.

The masked image output unit 23 may automatically detect a boundary between the portion showing a business card and the other portion showing a background, in a business card image, and construct and output a cutout frame, which is a frame showing the boundary. The cutout frame is indicated, for example, by lines or the like on the business card masked image. The information indicating a cutout frame constructed in this embodiment is, for example, multiple coordinates on the cutout frame. Alternatively, the information may be vector data indicating the cutout frame. Since a business card is typically rectangular, the masked image output unit 23 may detect four corners of a business card shown in a business card image, acquire the coordinates of the four corners as information indicating the cutout frame, and display lines or the like connecting the four corners, as the cutout frame, in an overlapping manner on the business card masked image. The technique for detecting corners of a rectangle in an image is a known technique, and, thus, a detailed description thereof has been omitted.

The output is a concept that encompasses display on a display screen, projection using a projector, transmission to an external apparatus, accumulation in a storage medium, delivery of a processing result to another processing apparatus or another program, and the like.

The masked image output unit 23 may be considered to include or not to include an output device such as a display screen. The masked image output unit 23 may be realized, for example, by driver software for an output device, a combination of driver software for an output device and the output device, or the like.

The input accepting unit 24 accepts input of a cutout instruction, which is an instruction containing an instruction to cut out the portion showing a business card, on the business card masked image. The portion showing a business card may be considered as a portion in which a business card is displayed. The cutout instruction is, for example, an instruction having input of information designating a cutout frame in a business card image and an instruction to cut out a region corresponding to a region indicated by the cutout frame, in the business card image corresponding to the business card masked image. The cutout instruction may be an instruction to cut out a region indicated by a cutout frame in a business card image, the cutout frame being automatically constructed and output by the masked image output unit, or may be an instruction to modify the cutout frame and cut out the region. The cutout instruction may include an instruction to modify an orientation of the business card image. The cutout instruction may be considered as input of an instruction to designate a cutout frame, or input of an instruction to modify the cutout frame. The cutout instruction may be considered as approval of an automatically set cutout frame.

The cutout instruction may be input by any part such as a numeric keypad, a keyboard, a mouse, a menu screen, or the like. The input accepting unit 24 may be realized by a device driver for an input part such as a numeric keypad or a keyboard, control software for a menu screen, or the like.

The business card image acquiring unit 25 acquires region information regarding a region that is to be cut out from the business card masked image according to the cutout instruction, and acquires a business card image of the region corresponding to the region information, from the business card image corresponding to the business card masked image. Specifically, the business card image acquiring unit 25 cuts out a business card image in the region indicated by the region information, from the business card image. The cutting out may be considered as extraction, trimming, or the like. The region that is to be cut out is, for example, a region surrounded by the above-described cutout frame. The region information is, for example, information indicating the above-described cutout frame.

The business card image acquiring unit 25 may further acquire a business card image having a predesignated shape and size, by modifying the shape of the cut out business card image. For example, if the business card image obtained by cutting out the region is rectangular, this rectangular shape may be changed to obtain a business card image having a predesignated aspect ratio, length, pixel number, and the like. The predesignated aspect ratio is, for example, an aspect ratio of a commonly used business card. The processing that changes the shape of an image into a predetermined shape is a known technique as a technique used for image processing software and the like, and, thus, a detailed description thereof has been omitted.

The business card image acquiring unit 25 may be realized typically by an MPU, a memory, or the like. Typically, the processing procedure of the business card image acquiring unit 25 is realized by software, and the software is stored in a storage medium such as a ROM. Note that the processing procedure may be realized also by hardware (a dedicated circuit).

The business card image accumulating unit 26 accumulates the business card image acquired by the business card image acquiring unit 25, in the second business card image storage unit 22. The business card image accumulated in the second business card image storage unit 22 may be transmitted by an unshown transmitting unit or the like via a network or the like to another apparatus, for example. For example, the business card image may be transmitted by an unshown transmitting unit or the like to the business card management server 10 or the like. In this case, the accumulation in the second business card image storage unit 22 may be considered as temporarily storing.

The business card image accumulating unit 26 may be realized typically by an MPU, a memory, or the like. Typically, the processing procedure of the business card image accumulating unit 26 is realized by software, and the software is stored in a storage medium such as a ROM. Note that the processing procedure may be realized also by hardware (a dedicated circuit).

Note that the first business card image storage unit 21 and the second business card image storage unit 22 may be realized by one business card image storage unit. In this case, when the business card image accumulating unit 26 accumulates a business card image in the second business card image storage unit 22, this image may be written over the business card image before extraction.

Figure 21:
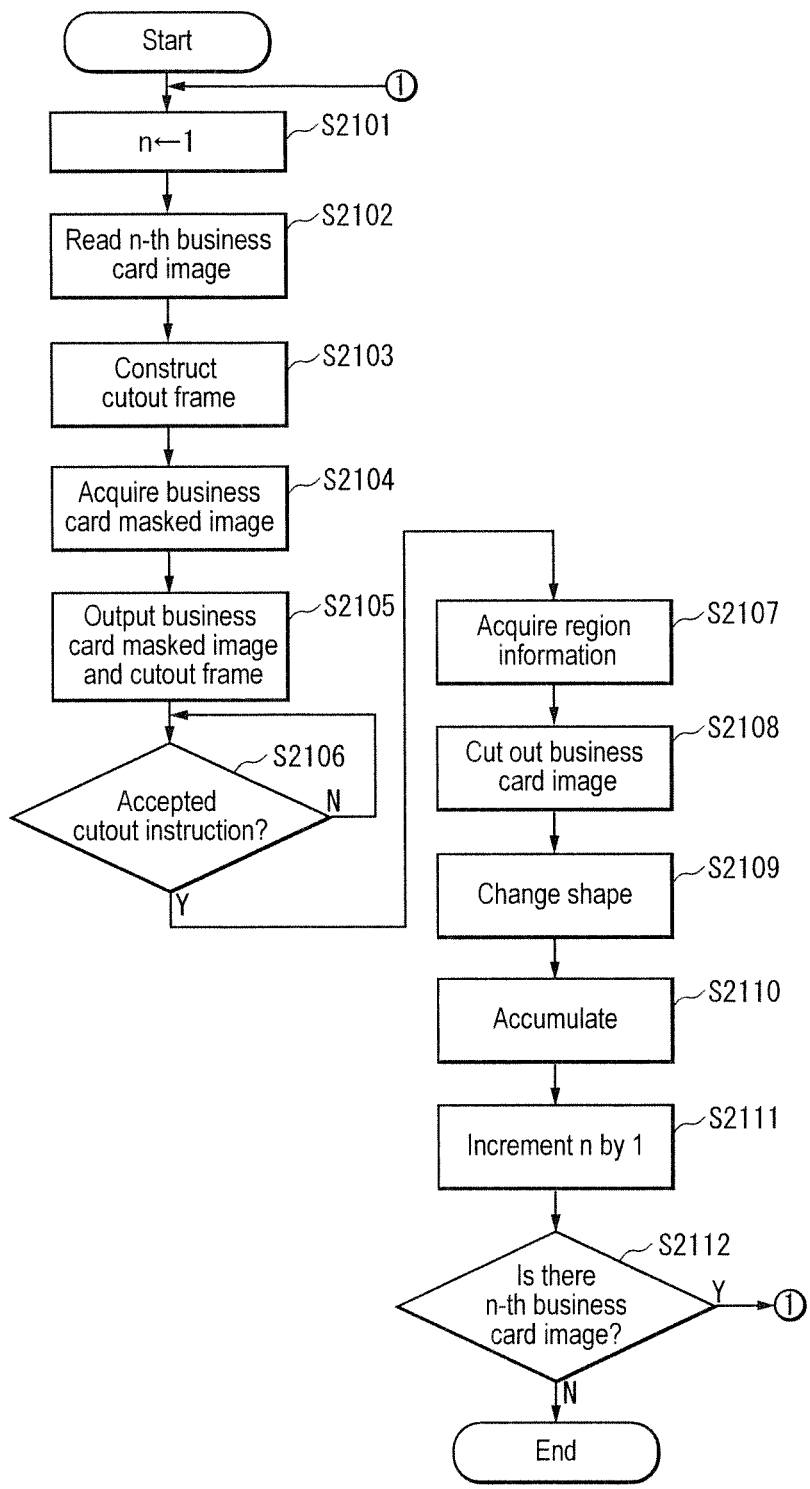
FIG. 21 is a flowchart illustrating an operation in the embodiment.

Next, an operation of the business card image acquiring apparatus 2 will be described with reference to the flowchart in FIG. 21.

(Step S2101) The masked image output unit 23 substitutes 1 for a counter n.

(Step S2102) The masked image output unit 23 reads an n-th business card image stored in the first business card image storage unit 21.

(Step S2103) The masked image output unit 23 constructs a cutout frame on the n-th business card image.

(Step S2104) The masked image output unit 23 acquires a business card masked image, using the n-th business card image.

(Step S2105) The masked image output unit 23 outputs the business card masked image and the cutout frame.

(Step S2106) The input accepting unit 24 judges whether or not a cutout instruction has been accepted. If it has been accepted, the procedure advances to step S2107, and, if not, the procedure returns to step S2106.

(Step S2107) The business card image acquiring unit 25 acquires region information.

(Step S2108) The business card image acquiring unit 25 cuts out a business card image in the region indicated by the region information of the n-th business card image.

(Step S2109) The business card image acquiring unit 25 changes the shape of the extracted business card image into a predesignated shape.

(Step S2110) The business card image accumulating unit 26 accumulates the business card image, in the second business card image storage unit 22.

(Step S2111) The masked image output unit 23 increments the counter n by 1.

(Step S2112) The masked image output unit 23 judges whether or not the n-th business card image is stored in the first business card image storage unit 21. If the masked image output unit 23 judges that the n-th business card image is stored, the procedure returns to step S2101, and, if not, the procedure is ended. The n-th business card image may be considered as an n-th business card image among the business card images that have not been processed yet at the start of the procedure.

Hereinafter, a specific operation of the business card image acquiring apparatus 2 in this embodiment will be described. In this example, a case in which the business card image acquiring apparatus 2 is an apparatus used by an operator who performs processing that extracts only the portion showing a business card from a business card image transmitted from a user will be described as an example.

It is assumed that a user who wants to manage business cards captures an image of a business card using a digital camera-attached smartphone (not shown), and transmits a business card image obtained by the image capturing and a user identifier to the business card image acquiring apparatus 2. It is assumed that the file name of the transmitted business card image is "U101NAME05.png" and the user identifier is "U101".

An unshown receiving unit of the business card image acquiring apparatus 2 receives the business card image "U101NAME05.png" and the user identifier transmitted from the user. The unshown receiving unit accumulates the received business card image and user identifier, in the first business card image storage unit 21.

FIG. 22 shows first business card image management information for managing business card images stored in the first business card image storage unit 21. The first business card image management information has the attributes "business card image" and "user ID". In the table, "business card image" is a file name of a business card image stored in the first business card image storage unit 21. In this example, a case in which a business card image stored in the first business card image storage unit 21 is a business card image captured by users as described above will be described as an example. Such a business card image is referred to as a captured business card image. Note that the stored business card image may not be a captured business card image. Furthermore, "user ID" is a user identifier of a user who transmitted a captured business card image.

For example, the operator of the business card image acquiring apparatus 2 inputs, to the input accepting unit 24 or the like, an instruction to extract only the portion showing a business card from a captured business card image stored in the first business card image storage unit 21.

The masked image output unit 23 reads a first captured business card image stored in the first business card image storage unit 21. For example, in this example, a captured business card image "U101NAME05.png", which is a record in the first row in the first business card image management information shown in FIG. 22, is read.

The masked image output unit 23 binarizes the read captured business card image, detects a boundary between the region showing a business card and the region showing a background, and constructs a cutout frame. For example, a white pixel region corresponding to the card face of the business card is detected in the binarized business card image, and a rectangle indicating its contour is detected. The masked image output unit 23 acquires the coordinates of the four corners of the rectangle as information indicating the cutout frame. It is assumed that the coordinates are coordinates in the same coordinate system as that set for the business card image. In this example, a captured business card image is binarized, but binarization does not always have to be performed. For example, instead of performing binarization, a range of the values of color differences or tones of pixels in the captured business card image may be used to detect a card face region, or whether or not a difference between the values of color differences or tones of adjacent pixels is less than a predesignated value may be used to detect a contour. The predesignated value may be a fixed value, or may be a variable value that changes according to the captured business card image or the like.

The masked image output unit 23 masks the image in the cutout frame of the captured business card image "U101NAME05.png", thereby constructing a business card masked image. In this example, the image in the cutout frame is subjected to blurring processing at a predesignated level. The blurring level is set to a level at which characters in the image are unrecognizable.

The masked image output unit 23 displays the business card masked image and the cutout frame in an overlapping manner, on an unshown monitor or the like. Specifically, the masked image output unit 23 outputs an image in which an image showing the cutout frame (specifically, an image of dotted lines connecting the coordinates of the four corners of the cutout frame) is arranged on the business card masked image constructed as described above. It is preferable that, for example, rectangular or circular images indicating anchor points for position change are displayed at the four corners of the cutout frame.

In this case, all the images displayed in the region showing the business card, in the displayed business card masked image, are masked by blurring, and, thus, the operator cannot recognize the content of the business card. Accordingly, the operator can be prevented from acquiring the personal information and the like of the business card.

Figure 23A:
FIG. 23 shows a view of a captured business card image (FIG. 23($a$)), and a view of a business card masked image (FIG. 23($b$)), according to the business card image acquiring apparatus in the embodiment.
Figure 23B:
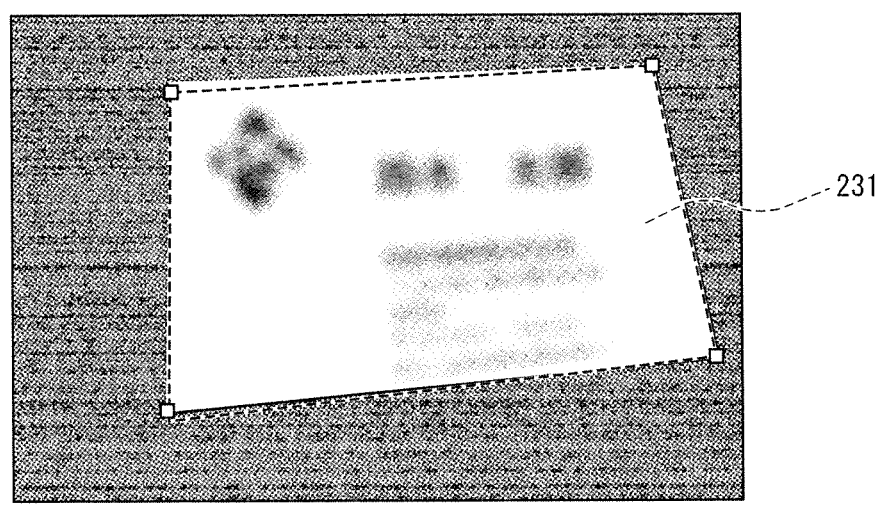

FIG. 23 shows a view of the captured business card image "U101NAME05.png" stored in the first business card image storage unit 21 (FIG. 23(*a*)), and a view of a business card masked image in which a cutout frame 231 is disposed after binarization (FIG. 23(*b*)).

Next, if the operator moves the position of one or more of the four corners of the cutout frame 231 using a mouse or the like, the input accepting unit 24 accepts this operation and changes the shape, the size, the position, or the like of the cutout frame 231. Accordingly, the coordinates of the four corners indicating the cutout frame are changed.

If the user inputs a cutout instruction to the input accepting unit 24, the business card image acquiring unit 25 acquires region information of the region indicated by the cutout frame 231 whose shape has been changed by the user operation. In this example, the coordinates of the four corners of the cutout frame 231 are acquired as the region information.

The business card image acquiring unit 25 again reads the captured business card image "U101NAME05.png" stored in the first business card image storage unit 21, and cuts out the image in the region indicated by the region information, from the captured business card image. Specifically, the image in the region obtained by connecting the coordinates of the four corners of the cutout frame 231 is acquired. Alternatively, the cutout may be considered as deleting the image outside the cutout frame.

Next, the business card image acquiring unit 25 changes the shape of the cut out image, thereby acquiring a business card image with a predesignated resolution, having the same aspect ratio as the business card.

Figure 24A:
FIG. 24 shows a view of a cut out image (FIG. 24($a$)), and a view of a business card image obtained by changing the shape (FIG. 24($b$)), according to the business card image acquiring apparatus in the embodiment.
Figure 24B:

FIG. 24 shows a view of an image cut out by the business card image acquiring unit 25 from the captured business card image "U101NAME05.png" (FIG. 24(a)), and a view of a business card image obtained by changing the shape of the cut out image (FIG. 24(b)).

The business card image accumulating unit 26 accumulates the business card image shown in FIG. 24(b), acquired by the business card image acquiring unit 25, in the second business card image storage unit 22. In this example, this image is provided with the same file name as the captured business card image before being cut out, and is accumulated in association with the same user ID "U101".

The business card image acquiring apparatus 2 performs similar processing also on the other captured business card images stored in the first business card image storage unit 21.

Accordingly, second business card image management information for managing second business card images stored in the second business card image storage unit 22, for example, similar to the first business card image management information shown in FIG. 22, is obtained.

The business card image acquiring apparatus 2 may transmit the business card images stored in the second business card image storage unit 22, for example, at a predesignated time or according to an instruction of the operator or the like, from an unshown transmitting unit or the like to the business card management server 10 or the like.

As described above, according to this embodiment, a business card masked image is output, and a cutout instruction on this business card masked image is accepted from an operator. Thus, it is possible to acquire a business card image obtained by cutting out the image in the portion showing a business card, while preventing the operator from recognizing information on the business card. Accordingly, it is possible to efficiently input information on a business card (e.g., business card image excluding the portion other than the business card, in this example), while easily protecting personal security.

In the foregoing embodiment, for example, an unshown server such as the business card management server 10 may transmit one captured business card image to multiple business card image acquiring apparatuses 2, the input accepting unit 24 of each business card image acquiring apparatus 2 may accept a cutout instruction containing an instruction to cut out a business card image portion, on the one captured business card image, from each operator, each business card image acquiring apparatus 2 may transmit this cutout instruction and the captured business card image to the business card management server 10 or the like, and, if the regions indicated by the received cutout instructions on the one captured business card image match each other, the business card management server 10 or the like may cut out a business card image from the captured business card image, using the cutout instruction. For example, if all of the distances between corresponding coordinates (e.g., coordinates that are closest to each other), among the coordinates defining the contours of the regions indicated by the multiple cutout instructions, are less than a predesignated value, it may be judged that the contours match each other. Also, the multiple cutout instructions and the one captured business card image may be transmitted to the privileged input terminal 30a, thereby causing the privileged operator or the like to judge whether or not the contours indicated by the cutout instructions match each other, by sight or the like. The processing that cuts out a business card image from the captured business card image may be performed by the business card management server 10, or may be performed by one business card image acquiring apparatus 2.

In the foregoing embodiment, each processing (each function) may be realized as integrated processing using a single apparatus (system), or may be realized as distributed processing using multiple apparatuses.

Furthermore, in the foregoing embodiments, it will be appreciated that two or more communication parts (the piece transmitting unit, the business card image receiving unit, etc.) in one apparatus may be physically realized by one medium.

Furthermore, in the foregoing embodiments, the case was described in which the business card image management apparatus is a stand-alone apparatus, but the business card image management apparatus may be either a stand-alone apparatus or a server apparatus in a server-client system. In the latter case, the output unit and the accepting unit may use a communication line to accept input, or to output a screen.

Furthermore, in the foregoing embodiments, each constituent element may be configured by dedicated hardware, or, alternatively, constituent elements that can be realized by software may be realized by executing a program. For example, each constituent element may be realized by a program execution unit such as a CPU reading and executing a software program stored in a storage medium such as a hard disk or a semiconductor memory. At the time of executing the program, the program execution unit may execute the program while accessing a storage unit (e.g., a storage medium such as a hard disk or a memory).

The software that realizes the business card management server in the foregoing embodiments may be the following sort of program. Specifically, this program is a program for causing a computer capable of accessing: a business card information storage unit in which one or more business card information each having a business card image and a business card identifier for identifying the business card image are stored; and a piece storage unit in which two or more pieces, each of which is an image in which only part of a business card image is recognizable, are stored for each of one or more business card images; to function as a business card management server forming a business card management system that includes: the business card management server that manages business card information; and one or more input terminals that output information on a business card; wherein the computer is caused to function as: a piece transmitting unit that transmits two or more piece information each of which has one of two or more pieces corresponding to one business card image and further has a business card identifier for identifying the one business card image, to the one or more input terminals; a partial business card information receiving unit that receives partial business card information having a business card identifier and a business card partial character string, which is a character string corresponding to apiece, from the input terminals; and a business card partial character string accumulating unit that accumulates the business card partial character string received by the partial business card information receiving unit, in the business card information storage unit, in association with the business card identifier received by the partial business card information receiving unit.

Furthermore, the software that realizes the business card image acquiring apparatus in the foregoing embodiment may be the following sort of program. Specifically, this program is a program for causing a computer capable of accessing: a first business card image storage unit in which a business card image is stored; and a second business card image storage unit in which a business card image, acquired from the business card image stored in the first business card image storage unit, is stored; to function as: a masked image output unit that constructs and outputs a business card masked image, which is a masked image in which characters that appear in the business card image stored in the first business card image storage unit are masked; an input accepting unit that accepts input of a cutout instruction, which is an instruction containing an instruction to cut out a business card image portion, on the business card masked image; a business card image acquiring unit that acquires region information regarding a region that is to be extracted from the business card masked image according to the cutout instruction, and acquires a business card image of the region corresponding to the region information, from the business card image corresponding to the business card masked image; and a business card image accumulating unit that accumulates the business card image acquired by the business card image acquiring unit, in the second business card image storage unit.

In the programs, in a transmitting step of transmitting information, a receiving step of receiving information, or the like, processing performed by hardware, for example, processing performed by a modem or an interface card in the transmitting step (processing that can be performed only by such hardware) is not included.

In the programs, the functions realized by the programs do not include functions that can be realized only by hardware. For example, functions that can be realized only by hardware, such as a modem or an interface card, in an acquiring unit that acquires information or an output unit that outputs information are not included in the functions realized by the above-described programs.

Furthermore, a computer that executes the programs may be a single computer or may be multiple computers. That is to say, integrated processing may be performed, or distributed processing may be performed.

Figure 25:
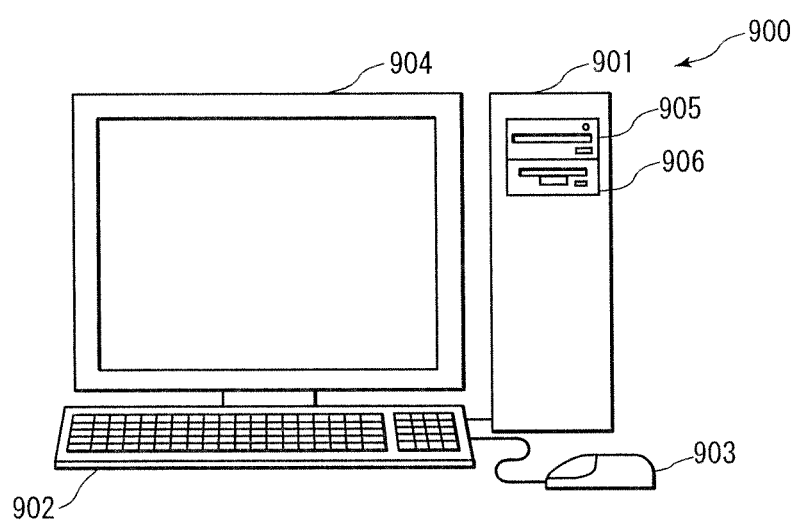
FIG. 25 is a view showing an exemplary appearance of a computer system in the embodiments of the present invention.

FIG. 25 is a schematic view showing an exemplary appearance of a computer that executes the programs described above to realize the business card management server, the input terminals, the privileged input terminals, the business card image acquiring apparatus, and the like in the foregoing embodiments. The foregoing embodiments may be realized using computer hardware and computer programs executed thereon.

In FIG. 25, a computer system 900 is provided with a computer 901 including a compact disk read only memory (CD-ROM) drive 905 and a Floppy (registered trademark) disk (FD) drive 906, a keyboard 902, a mouse 903, and a monitor 904.

Figure 26:
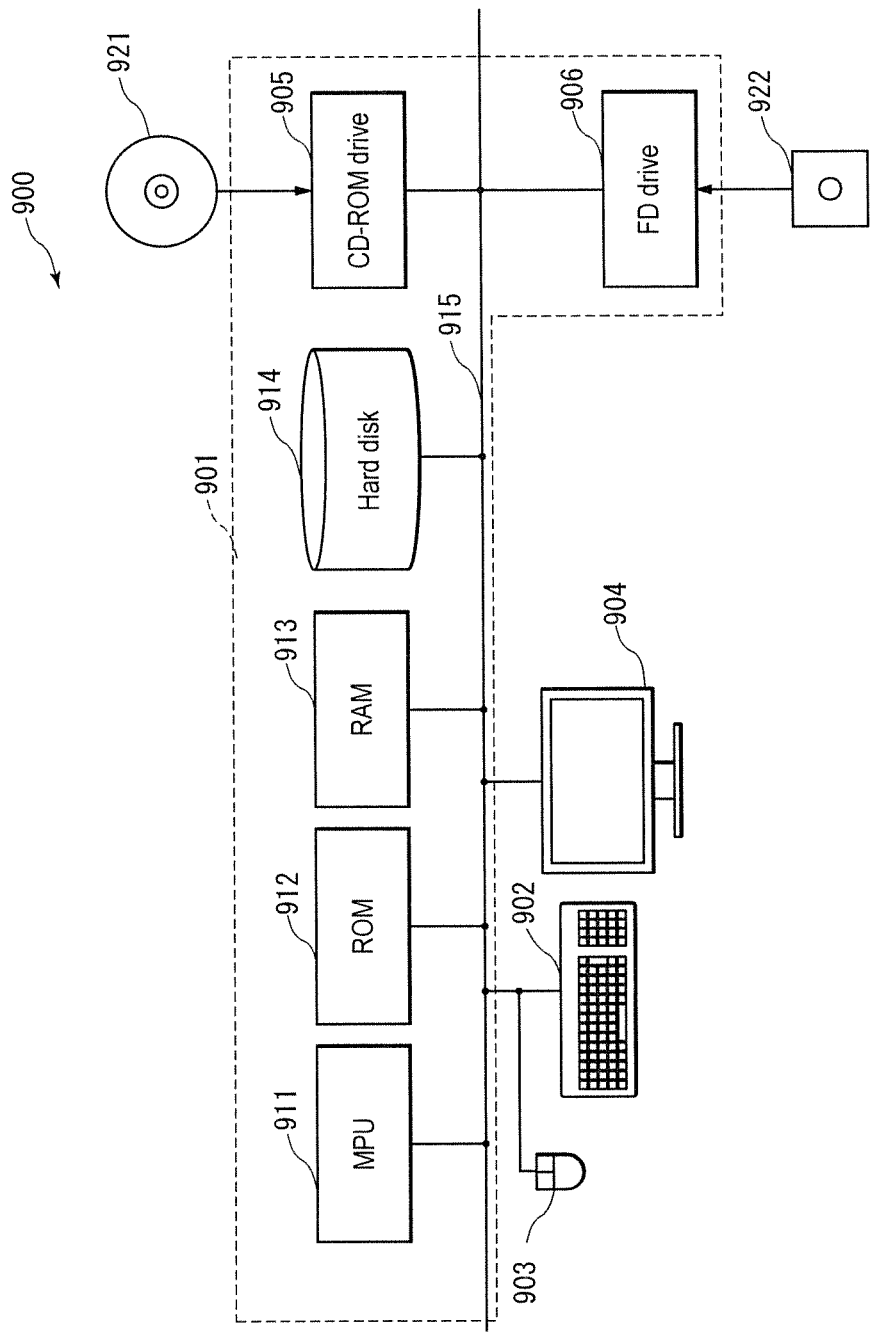
FIG. 26 is a diagram showing an exemplary configuration of the computer system in the embodiments.

FIG. 26 is a diagram showing an internal configuration of the computer system 900. In FIG. 26, the computer 901 is provided with, in addition to the CD-ROM drive 905 and the FD drive 906, a micro processing unit (MPU) 911, a ROM 912 in which a program such as a boot up program is to be stored, a random access memory (RAM) 913 that is connected to the MPU 911 and in which a command of an application program is temporarily stored and a temporary storage area is to be provided, a hard disk 914 in which an application program, a system program, and data are stored, and a bus 915 that connects the MPU 911, the ROM 912, and the like. Note that the computer 901 may include an unshown network card for providing a connection to a LAN.

The program for causing the computer system 900 to execute the functions of the business card management server and the like in the foregoing embodiments may be stored in a CD-ROM 921 or an FD 922 that is inserted into the CD-ROM drive 905 or the FD drive 906, and be transmitted to the hard disk 914. Alternatively, the program may be transmitted via an unshown network to the computer 901 and stored in the hard disk 914. At the time of execution, the program is loaded into the RAM 913. The program may be loaded from the CD-ROM 921 or the FD 922, or directly from a network.

The program does not necessarily have to include, for example, an operating system (OS) or a third party program to cause the computer 901 to execute the functions of the business card management server in the foregoing embodiments. The program may only include a command portion to call an appropriate function (module) in a controlled mode and obtain desired results. The manner in which the computer system 900 operates is well known, and, thus, a detailed description thereof has been omitted.

The present invention is not limited to the embodiments set forth herein. Various modifications are possible within the scope of the invention.

INDUSTRIAL APPLICABILITY

As described above, the business card management server and the like according to the present invention are suitable as a server that manages information on business cards, and are particularly useful, for example, as a server that manages information on business cards read from business card images.

The invention claimed is:

1. A business card management server computer constituting a business card management system that includes: the business card management server computer that manages business card information; and two or more input terminals that input information on a business card, wherein:
 the business card management server computer comprises:
  a business card information storage unit in which one or more business card information each having a business card image and a business card identifier for identifying the business card image are stored;
  a piece storage unit in which two or more pieces, each of which is an image in which only part of a business card image is recognizable, are stored for each of one or more business card images;

a piece transmitting unit that transmits two or more piece information each of which has one of two or more pieces corresponding to one business card image and further has a business card identifier for identifying the one business card image, to different input terminals of the two or more input terminals, respectively, so that an operator of each of the two or more input terminals sees only a part of the business card image;

a partial business card information receiving unit that receives partial business card information having a business card identifier and a business card partial character string, which is a character string corresponding to a piece, from the two or more input terminals; and a business card partial character string accumulating unit that accumulates the business card partial character string received by the partial business card information receiving unit, in the business card information storage unit, in association with the business card identifier received by the partial business card information receiving unit, each of the two or more input terminals comprises:
an accepting unit that accepts input of an operator who inputs a business card partial character string;
a piece receiving unit that receives the piece information from the business card management server computer;
a piece output unit that outputs a piece contained in the piece information received by the piece receiving unit; and
a partial business card information transmitting unit that transmits partial business card information having the business card partial character string accepted by the accepting unit and the business card identifier received by the piece receiving unit, to the business card management server computer, the business card information has a business card image, a business card identifier, and two or more pairs of a business card partial character string and item information, which is information indicating an item of the business card partial character string, the partial business card information receiving unit receives partial business card information having a business card identifier, a business card partial character string, and item information, from the two or more input terminals, the business card partial character string accumulating unit accumulates the business card partial character string received by the partial business card information receiving unit, in the business card information storage unit, in association with the business card identifier and the item information received by the partial business card information receiving unit, the accepting unit of each of the two or more input terminals accepts one or at least two pairs of a business card partial character string and item information, from the operator, and the partial business card information transmitting unit transmits partial business card information having a pair of the business card partial character string and the item information accepted by the accepting unit and the business card identifier received by the piece receiving unit, to the business card management server computer.

2. The business card management server computer according to claim 1, further comprising:

a piece generating unit that acquires two or more pieces from a business card image stored in the business card information storage unit, and accumulates the two or more pieces in the piece storage unit.

3. The business card management server computer according to claim 1, further comprising:

a determination condition storage unit in which a determination condition, which is a condition for determining the business card partial character strings and is a condition indicating that business card partial character strings transmitted from the two or more input terminals of at least two or more operators match each other, is stored; and a determination judging unit that, in a case where the partial business card information receiving unit receives two or more business card partial character strings of the same item corresponding to one business card identifier, from two or more input terminals, judges whether or not the two or more business card partial character strings match the determination condition, wherein the business card partial character string accumulating unit determines the business card partial character strings, only in a case where the determination judging unit judges that the business card partial character strings match the determination condition.

4. The business card management server computer according to claim 3, further comprising:

a privilege identifier storage unit in which a privilege identifier, which is information for communicating with an input terminal of a privileged operator who can view a business card image without masking, is stored; and a business card image transmitting unit that, in a case where a business card partial character string corresponding to at least part of items of one business card image is undetermined, transmits input prompting information and a business card identifier of the one business card image, the input prompting information being information for prompting a privileged input terminal, which is an input terminal identified with the privilege identifier, to input the undetermined business card partial character string, wherein the partial business card information receiving unit receives partial business card information having the business card identifier and the undetermined business card partial character string, from the privileged input terminal, and the privileged input terminal includes:
a privileged accepting unit that accepts input of a privileged operator who inputs the undetermined business card partial character string;
an input prompting information receiving unit that receives input prompting information and a business card identifier, from the business card management server computer;
an input prompting information output unit that outputs the input prompting information received by the input prompting information receiving unit; and
a privileged partial business card information transmitting unit that transmits partial business card information having the business card partial character string accepted by the accepting unit and the business card identifier received by the business card image receiving unit, to the business card management server computer.

5. The business card management server computer according to claim 4, wherein the input prompting information contains a business card image without masking.

6. The business card management server computer according to claim 2, further comprising:
 a business card image receiving unit that receives a business card image; and
 a registration judging unit that judges whether or not the same business card image as the business card image is stored in the business card information storage unit,
 wherein the piece generating unit acquires two or more pieces from the business card image, and accumulates the two or more pieces in the piece storage unit, in a case where the registration judging unit judges that there is no same business card image.

7. The business card management server computer according to claim 1,
 wherein the business card management system includes two or more business card management server computers,
 one of the business card management server computers further includes:
  a language judging unit that judges a language in a business card image; and
  a foreign business card image transmitting unit that transmits a business card image, to a business card management server computer different from the one business card management server computer, according to the language judged by the language judging unit,
 the piece receiving unit of part of the two or more input terminals receives piece information having a business card identifier and a piece, from the business card management server computer different from the one business card management server computer, and
 the partial business card information transmitting unit of the part of the two or more input terminals transmits partial business card information having the business card partial character string accepted by the accepting unit and the business card identifier received by the piece receiving unit, to the business card management server computer different from the one business card management server computer.

8. The business card management server computer according to claim 1, wherein the piece is a masked image masked so as to be unrecognizable except for part of a business card image.

9. The business card management server computer according to claim 1, wherein the piece is an extracted image obtained by extracting part of a business card image.

10. The business card management server computer according to claim 9, wherein the piece includes both of a masked image masked so as to be unrecognizable except for part of a business card image, and the extracted image.

11. A non-transitory computer-readable storage medium in which a program is stored, wherein:
 the program, when executed by a computer, causes the computer to:
  access: a business card information storage unit in which one or more business card information each having a business card image and a business card identifier for identifying the business card image are stored; and a piece storage unit in which two or more pieces, each of which is an image in which only part of a business card image is recognizable, are stored for each of one or more business card images;
  function as a business card management server constituting a business card management system that includes: the business card management server that manages business card information; and two or more input terminals that output information on a business card; and
 function as:
  a piece transmitting unit that transmits two or more piece information each of which has one of two or more pieces corresponding to one business card image and further has a business card identifier for identifying the one business card image, to different input terminals of the two or more input terminals, respectively, so that an operator of each of the two or more input terminals sees only a part of the business card image;
  a partial business card information receiving unit that receives partial business card information having a business card identifier and a business card partial character string, which is a character string corresponding to a piece, from the two or more input terminals; and
  a business card partial character string accumulating unit that accumulates the business card partial character string received by the partial business card information receiving unit, in the business card information storage unit, in association with the business card identifier received by the partial business card information receiving unit,
 the business card information has a business card image, a business card identifier, and two or more pairs of a business card partial character string and item information, which is information indicating an item of the business card partial character string,
 the partial business card information receiving unit receives partial business card information having a business card identifier, a business card partial character string, and item information, from the two or more input terminals,
 the business card partial character string accumulating unit accumulates the business card partial character string received by the partial business card information receiving unit, in the business card information storage unit, in association with the business card identifier and the item information received by the partial business card information receiving unit, and
 each of the two or more input terminals accepts one or at least two pairs of a business card partial character string and item information, from the operator, and transmits partial business card information having a pair of the business card partial character string and the item information accepted and the business card identifier received, to the business card management server.

12. A business card management server, comprising:
 a computer; and
 one or more non-transitory computer-readable storage media, wherein:
 the one or more non-transitory computer-readable storage media include:
  a business card information storage unit in which one or more business card information each having a business card image and a business card identifier for identifying the business card image are stored;
  a piece storage unit in which two or more pieces, each of which is an image in which only part of a business card image is recognizable, are stored for each of one or more business card images; and a control program, and the control program, when executed by the computer, causes the computer to functions as:

a piece transmitting unit that transmits two or more piece information each of which has one of two or more pieces corresponding to one business card image and further has a business card identifier for identifying the one business card image, to different input terminals of two or more input terminals, respectively, so that an operator of each of the two or more input terminals sees only a part of the business card image;

a partial business card information receiving unit that receives partial business card information having a business card identifier and a business card partial character string, which is a character string corresponding to a piece, from the two or more input terminals; and a business card partial character string accumulating unit that accumulates the business card partial character string received by the partial business card information receiving unit, in the business card information storage unit, in association with the business card identifier received by the partial business card information receiving unit, the business card information has a business card image, a business card identifier, and two or more pairs of a business card partial character string and item information, which is information indicating an item of the business card partial character string, the partial business card information receiving unit receives partial business card information having a business card identifier, a business card partial character string, and item information, from the two or more input terminals, the business card partial character string accumulating unit accumulates the business card partial character string received by the partial business card information receiving unit, in the business card information storage unit, in association with the business card identifier and the item information received by the partial business card information receiving unit, and each of the two or more input terminals accepts one or at least two pairs of a business card partial character string and item information, from the operator, and transmits partial business card information having a pair of the business card partial character string and the item information accepted and the business card identifier, to the business card management server.

13. A business card management system, comprising:

a business card management server computer that manages business card information; and two or more input terminals that input information on a business card, wherein:

the business card management server computer comprises:

a business card information storage unit in which one or more business card information each having a business card image and a business card identifier for identifying the business card image are stored;

a piece storage unit in which two or more pieces, each of which is an image in which only part of a business card image is recognizable, are stored for each of one or more business card images;

a piece transmitting unit that transmits two or more piece information each of which has one of two or more pieces corresponding to one business card image and further has a business card identifier for identifying the one business card image, to different input terminals of the two or more input terminals, respectively, so that an operator of each of the two or more input terminals sees only a part of the business card image;

a partial business card information receiving unit that receives partial business card information having a business card identifier and a business card partial character string, which is a character string corresponding to a piece, from the two or more input terminals; and a business card partial character string accumulating unit that accumulates the business card partial character string received by the partial business card information receiving unit, in the business card information storage unit, in association with the business card identifier received by the partial business card information receiving unit, and each of the two or more input terminals comprises:

an accepting unit that accepts input of an operator who inputs a business card partial character string;

a piece receiving unit that receives the piece information from the business card management server computer;

a piece output unit that outputs a piece contained in the piece information received by the piece receiving unit; and a partial business card information transmitting unit that transmits partial business card information having the business card partial character string accepted by the accepting unit and the business card identifier received by the piece receiving unit, to the business card management server computer, the business card information has a business card image, a business card identifier, and two or more pairs of a business card partial character string and item information, which is information indicating an item of the business card partial character string, the partial business card information receiving unit receives partial business card information having a business card identifier, a business card partial character string, and item information, from the two or more input terminals, the business card partial character string accumulating unit accumulates the business card partial character string received by the partial business card information receiving unit, in the business card information storage unit, in association with the business card identifier and the item information received by the partial business card information receiving unit, the accepting unit of each of the two or more input terminals accepts one or at least two pairs of a business card partial character string and item information, from the operator, and the partial business card information transmitting unit transmits partial business card information having a pair of the business card partial character string and the item information accepted by the accepting unit and the business card identifier received by the piece receiving unit, to the business card management server computer.

* * * * *